US012560359B2

(12) United States Patent

Morankar et al.

(10) Patent No.: US 12,560,359 B2

(45) Date of Patent: Feb. 24, 2026

(54) AUTONOMOUS CLEANING SYSTEMS AND METHODS FOR PHOTOVOLTAIC MODULES

(71) Applicant: Nextpower LLC, Fremont, CA (US)

(72) Inventors: Jitendra Morankar, Telangana (IN); Abhimanyu Sable, Hyderabad (IN); Phani Kumar, Hyderabad (IN)

(73) Assignee: NEXTPOWER LLC, Fremont, CA (US)

( * ) Notice: Subject to any disclaimer, the term of this patent is extended or adjusted under 35 U.S.C. 154(b) by 576 days.

(21) Appl. No.: 17/941,642

(22) Filed: Sep. 9, 2022

(65) Prior Publication Data

US 2023/0072681 A1    Mar. 9, 2023

Related U.S. Application Data

(60) Provisional application No. 63/349,820, filed on Jun. 7, 2022, provisional application No. 63/242,240, filed on Sep. 9, 2021.

(51) Int. Cl.
| | |
|---|---|
| *F24S 25/634* | (2018.01) |
| *F24S 25/00* | (2018.01) |
| *F24S 40/20* | (2018.01) |

(52) U.S. Cl.
CPC ............. *F24S 25/634* (2018.05); *F24S 40/20* (2018.05); *F24S 2025/011* (2018.05)

(58) Field of Classification Search
CPC ...... B24B 23/005; Y02E 10/47; F24S 30/425; F24S 25/65; F24S 25/10; F24S 25/13; B24S 50/20; F16M 11/10; F16M 11/18
See application file for complete search history.

(56) References Cited

U.S. PATENT DOCUMENTS

| | | | |
|---|---|---|---|
| 9,120,583 B1* | 9/2015 | Spence ................... | H02S 30/20 |
| 10,797,636 B2 | 10/2020 | Meller et al. | |
| 2010/0071684 A1* | 3/2010 | Cowan .................... | F24S 50/00 |
| | | | 700/275 |
| 2015/0082924 A1 | 3/2015 | Morgan | |
| 2016/0365830 A1* | 12/2016 | Bailey ...................... | F24S 25/11 |
| 2017/0366133 A1* | 12/2017 | Taha ....................... | H10F 19/00 |
| 2019/0212410 A1* | 7/2019 | Au ......................... | G01S 3/7861 |

(Continued)

FOREIGN PATENT DOCUMENTS

| | | |
|---|---|---|
| CN | 205762538 U | 12/2016 |
| CN | 106391627 A | 2/2017 |
| CN | 207368967 U | 5/2018 |

(Continued)

OTHER PUBLICATIONS

PCT Search Report and Written Opinion issued in PCT Application No. PCT/US2022/043064 dated Dec. 29, 2022.

(Continued)

*Primary Examiner* — Joel D Crandall

(74) *Attorney, Agent, or Firm* — Fredrikson & Byron, P.A.

(57) ABSTRACT

A docking station for use with a solar tracking system includes a frame configured to selectively support solar cleaning equipment thereon and a mounting bracket operably coupled to a portion of the frame. The mounting bracket maintains a gap between adjacent edges of the frame and an adjacent solar module, and the frame includes a width that approximates a width of the solar module.

12 Claims, 23 Drawing Sheets

(56)                         References Cited

U.S. PATENT DOCUMENTS

2021/0058026 A1      2/2021   Allouche

FOREIGN PATENT DOCUMENTS

| CN | 111147011 A | 5/2020 |
|----|-------------|--------|
| CN | 211127674 U | 7/2020 |
| CN | 112577545 A | 3/2021 |
| CN | 213213406 U | 5/2021 |
| WO | 2018010508 A1 | 1/2018 |
| WO | 2021144767 A1 | 7/2021 |

OTHER PUBLICATIONS

European Patent Office, "Extended European Search Report", Application No. 22868119.3, Dated Oct. 2, 2025, pp. 11.
European Patent Office, "Partial Supplementary European Search Report", Application No. 22868119.3, Dated Jul. 7, 2025, pp. 14.

\* cited by examiner

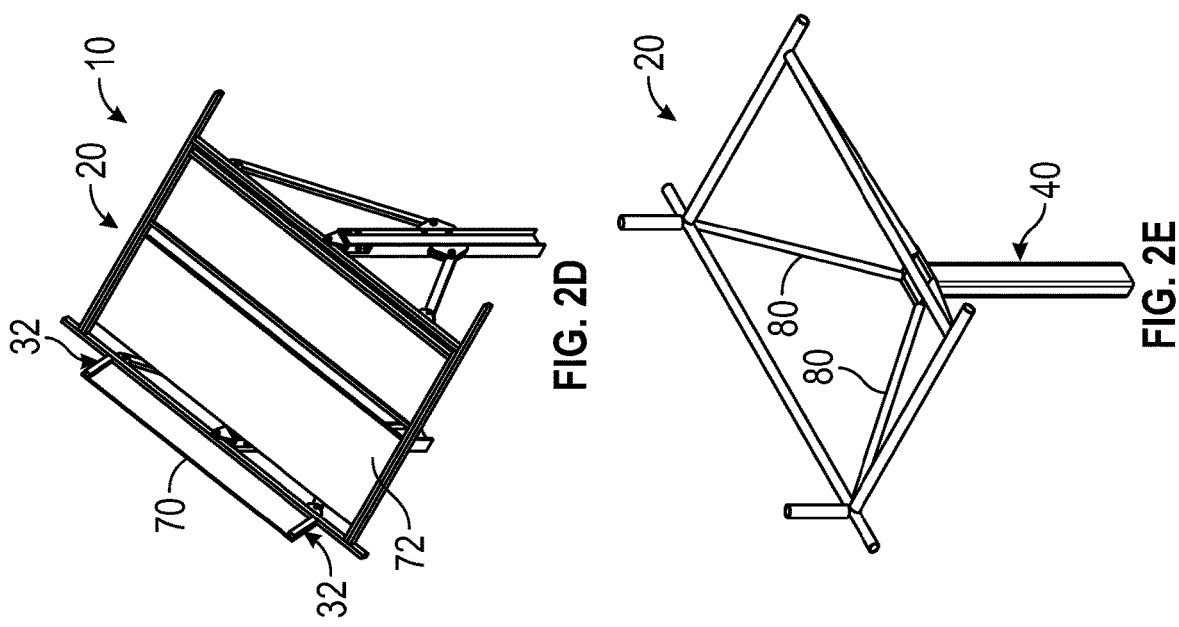
FIG. 2D
FIG. 2E
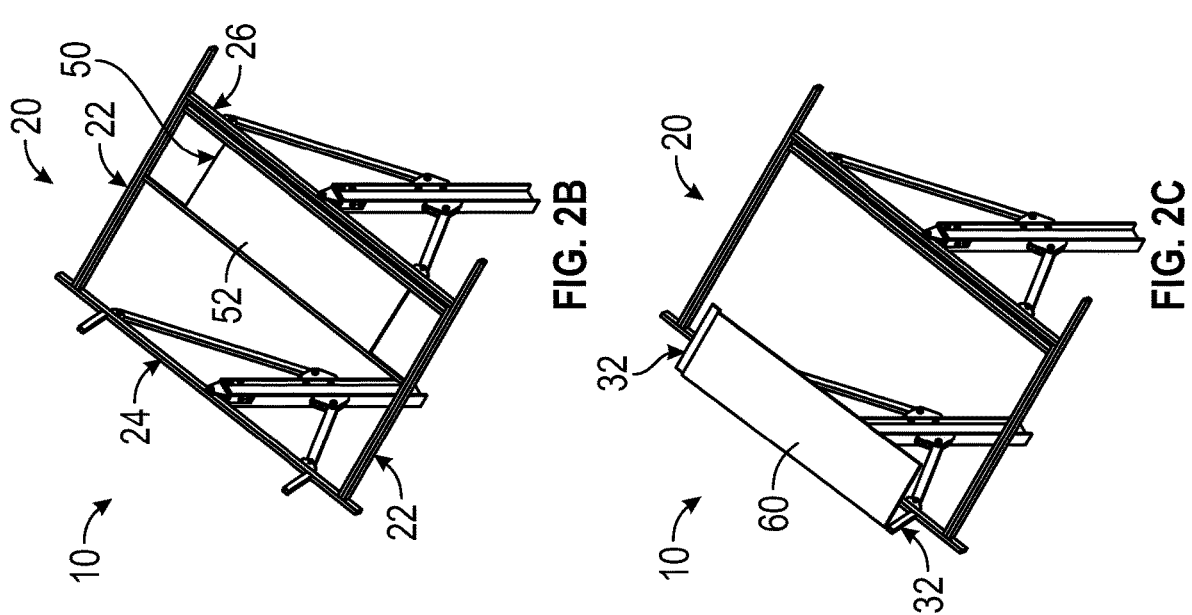
FIG. 2B
FIG. 2C

FIG. 4                    FIG. 4A

AUTONOMOUS CLEANING SYSTEMS AND METHODS FOR PHOTOVOLTAIC MODULES

CROSS-REFERENCE TO RELATED APPLICATION

The present application claims the benefit of, and priority to, U.S. Provisional Patent Application Ser. No. 63/349,820, filed on Jun. 7, 2022, and U.S. Provisional Patent Application Ser. No. 63/242,240, filed on Sep. 9, 2021, the entire content of each of which is hereby incorporated by reference herein.

BACKGROUND

Technical Field

The present disclosure relates to solar power generation systems, and more particularly, to autonomous cleaning systems for photovoltaic modules.

Background of Related Art

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length.

As can be appreciated, the ability of the solar cells to generate electrical energy is diminished as the surface of the solar cells becomes dirty, through dust, soil, pollen, etc. As the layer of dust becomes thicker, or the layer covers more surface area of the solar cells, the amount of energy generated is diminished and the solar panel system will not perform at peak efficiency. Further, dust partially or fully covering the surface of the solar cells can cause hot spots to form on the uncovered portions of the solar cell, causing accelerated degradation of the solar cell.

In view of the numerous issues caused by dirty solar cells, it is important to regularly clean the surface of the cells to ensure the solar panel system operates as close to peak efficiency as possible. Typically, the numerous solar panels are cleaned using a specialized vehicle or manually using water. As can be appreciated, such cleaning requires enormous manpower, as the size of the solar system may cover several acres. The present disclosure seeks to address the shortcomings of prior solar tracker cleaning systems.

SUMMARY

In accordance with an aspect of the present disclosure, a docking station for use with a solar tracking system includes a frame configured to selectively support a solar cleaning equipment thereon and a mounting bracket operably coupled to a portion of the frame. The mounting bracket maintains a gap between adjacent edges of the frame and an adjacent solar module and the frame includes a width that approximates a width of the solar module.

In aspects, the mounting bracket may maintain the frame in a fixed position.

In other aspects, the mounting bracket may permit the frame to move simultaneously with movement of an adjacent solar module.

In certain aspects, the width of the frame may be fixed.

In other aspects, the width of the frame may be adjustable.

In aspects, the width of the frame may be adjustable from about 2000 mm to about 2400 mm.

In certain aspects, the frame may include telescoping members to permit adjustment of a width of the frame.

In aspects, the mounting bracket may be coupled to a portion of a torque tube of the adjacent solar module such that rotation of the torque tube effectuates a corresponding rotation of the mounting bracket and thereby the frame.

In accordance with another embodiment of the present disclosure, a row-to-row bridge for use with a solar tracking system includes a frame configured to selectively support cleaning equipment and accommodate twisting of one end portion thereof relative to a second end portion thereof, a first mounting bracket interconnecting a first portion of the frame and a portion of a first adjacent solar module, and a second mounting bracket interconnecting a second portion of the frame and a portion of a second adjacent solar module.

In aspects, the frame may include a pair of transverse beams disposed in spaced relation to one another and each extending between opposed first and second end portions, each of the pair of transverse beams coupled to a respective one of the first and second adjacent solar modules such that rotation of the adjacent first and second solar modules effectuates a corresponding rotation of the frame.

In other aspects, the frame may include a pair of parallel beams interposed between the pair of transverse beams and operably coupled thereto, wherein the pair of parallel beams cooperate to permit differing degrees of rotation of a first transverse beam relative to a second transverse beam about an axis defined perpendicular to the pair of transverse beams.

In certain aspects, each of the parallel beams may include an inner tube and an outer tube configured to rotatably and translatably receive a portion of the inner tube therein.

In other aspects, each of the parallel beams may include an insert disposed within a portion of the outer tube, the insert defining a bore therethrough configured to rotatably and translatably support a portion of the inner tube therein.

In aspects, each of the parallel beams may include a corresponding pair of couplings operably coupled to respective first and second end portions thereof, each of the pair of couplings configured to rotatably couple the pair of parallel beams to each respective transverse beam of the pair of transverse beams.

In accordance with another aspects of the present disclosure, a row-to-row bridge for use with a solar tracking system includes a frame configured to selectively support cleaning equipment thereon, wherein the frame is configured to accommodate twisting of one end portion thereof relative to a second end portion thereof, and a pair of mounting brackets configured to couple the frame to a pair of adjacent solar modules, wherein the frame is configured to selectively permit adjustment of a width of the frame.

In aspects, the frame may include telescoping members to permit adjustment of the width of the frame.

In certain aspects, the telescoping members may include a detent mechanism configured to selectively lock the telescoping members to one another and maintain a desired width of the frame.

In other aspects, the detent mechanism may be a button pin.

In aspects, each of the telescoping members may include a corresponding plurality of holes defined therethrough, wherein the plurality of holes of each of the telescoping members and the detent mechanism cooperate to selectively define a width of the frame.

In other aspects, the frame may include a pair of parallel beams, each beam of the parallel beams including an inner tube and an outer tube configured to rotatably and translatably receive a portion of the inner tube therein.

In accordance with another aspect of the present disclosure, a bridge for use with a solar tracking system includes a frame configured to selectively support cleaning equipment thereon, where the frame is configured to bridge a gap between adjacent solar modules, the gap configured to accommodate a slew drive, and a pair of mounting brackets configured to couple the frame to a pair of adjacent torque tubes, each torque tube coupled to a respective output of the slew drive, wherein the frame is configured to selectively permit adjustment of a width of the frame.

In aspects, wherein the frame may be collapsible from an open, expanded position to a closed, folded position.

In certain aspects, the frame may include hinges operably coupled thereto to permit the transition from the open, expanded position, to the closed, folded position.

In other aspects, the hinges may be disposed adjacent an end portion of respective beams forming the frame.

In certain aspects, the frame may include a pair of parallel beams, at least one of the parallel beams defining an arcuate profile.

In other aspects, the frame may include a pair of transverse beams, at least one of the pair of transverse beams defining a flange, the flange couplable to a portion of an adjacent solar module.

BRIEF DESCRIPTION OF THE DRAWINGS

Various aspects and features of the present disclosure are described hereinbelow with reference to the drawings, wherein:

FIG. 2B is a perspective view of the docking station of FIG. 2 including a photovoltaic module disposed on a frame thereof;

FIG. 2C is a perspective view of the docking station of FIG. 2 including a photovoltaic module disposed on brush supports thereof;

FIG. 2D is a perspective view of the docking station of FIG. 2 including wind protection plates disposed thereon;

FIG. 2E is a perspective view of an alternative embodiment of the docking station of FIG. 2 having a single base;

FIG. 4 is an exploded view of the flexible length docking station of FIG. 3;

FIG. 4A is a perspective view of a gusset of the flexible length docking station of FIG. 3;

DETAILED DESCRIPTION

Figures 1, 1A, 2, 2A:
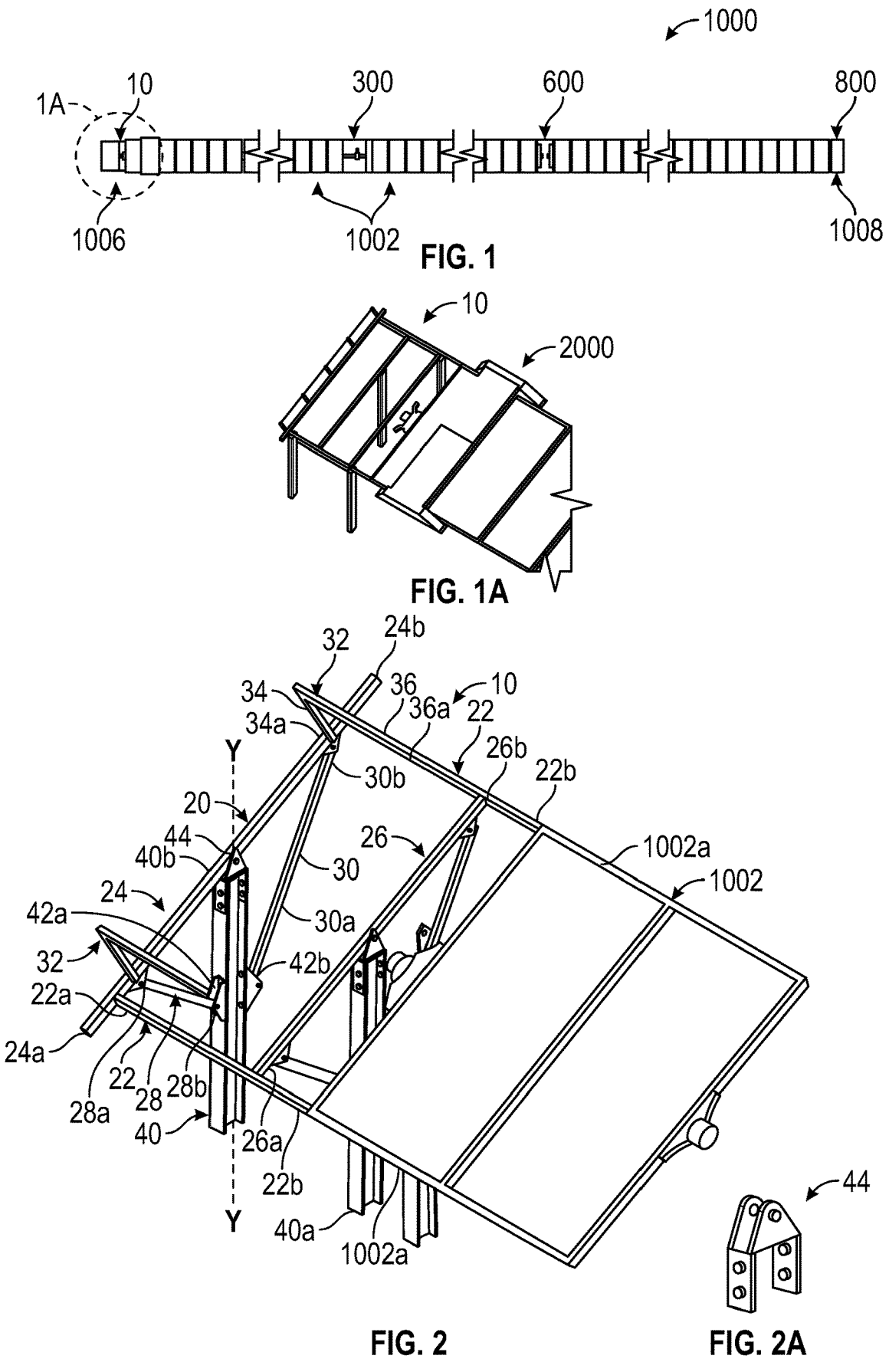
FIG. 1 a plan view of a solar tracking system in accordance with the present disclosure.
FIG. 1A is an enlarged view of the area of detail indicated in FIG. 1.
FIG. 2 is a perspective view of a docking station of the solar tracking system of FIG. 1.
FIG. 2A is a perspective view of an upper bracket of the docking station of FIG. 2.

The present disclosure is directed to mechanisms for storage and transport of cleaning equipment over a length of solar panels. As can be appreciated, in an effort to extract as much solar energy as possible, solar trackers have been developed that are quite large, spanning hundreds of feet in length. Further, to extract energy more efficiently, solar tracking systems rotate solar modules to maintain a desired orientation towards the sun as the sun traverses the sky from east to west. To accommodate this movement, the solar tracking systems are broken up into numerous sections along their length to minimize tortional loads and deflection, and to accommodate various mechanical systems, such as gear drives, communication antennae, amongst others. As such, gaps are formed between adjacent solar modules that inhibit the free movement of the cleaning equipment across an entire length of a tracking system.

The present disclosure includes docking stations, bridges, and other devices configured to permit the free movement of the solar modules while permitting movement of cleaning equipment across and entire row of solar modules and parking of solar modules while not in use. In particular, the docking stations described herein may be stationary such that the solar modules may rotate relative thereto or may be coupled to a torque tube of adjacent solar modules to enable the docking station to rotate in unison with the solar modules. In this manner, the docking station is separated from the adjacent solar module to provide a gap to permit free movement of the solar module relative to the docking station and vice versa. The docking station provides a location for the cleaning equipment to park or otherwise be placed when not in use, to avoid parking on a solar module and reducing the overall capacity of the solar module to absorb energy.

Similarly, slew drive bridges and row-to-row bridges are provided in accordance with the present disclosure to bridge a gap formed between adjacent solar modules where slew drives or other electromechanical systems are located and between adjacent rows of solar modules. In this manner, the bridges enable the cleaning equipment to traverse an entire row of solar modules or multiple rows of solar modules to reduce the amount of cleaning equipment required.

Further, as can be appreciated, once the cleaning equipment reaches a final solar module in a row of solar modules, it is difficult to clean the entirety of the solar module since the cleaning equipment is unable to extend therepast. To alleviate this issued, a return station is provided in accordance with the present disclosure which provides a location at which the cleaning equipment may traverse past the last solar module and to enable the cleaning equipment to fully clean the last solar module of the solar tracking system and to provide a means to alert the cleaning equipment that the end of the row of solar modules and to inhibit the cleaning equipment from falling off or otherwise becoming disengaged from the solar tracking system.

With reference to the drawings, a solar tracking system is illustrated in FIGS. 1 and 1A and generally identified by reference numeral 1000. The solar tracking system 1000 includes one or more solar modules 1002 disposed adjacent to one another to form a continuous row. As can be appreciated, the solar tracking system 1000 includes a first end portion 1006 and an opposite, second end portion 1008. The first end portion 1006 includes a docking station 10 disposed adjacent thereto to provide a space for cleaning equipment 2000 to dock or otherwise be retained when the cleaning equipment 2000 is not in use. The second end portion 1008 includes a return station 800 disposed adjacent thereto to provide a location at which the cleaning equipment 2000 may traverse to enable the cleaning equipment 2000 to fully clean the last solar module 1002 of the solar tracking system 1000 and to provide a means to alert the cleaning equipment

2000 that the end of the row of solar modules 1002 and to inhibit the cleaning equipment 2000 from falling off or otherwise becoming disengaged from the solar tracking system 1000.

The solar tracking system 1000 includes numerous slew drives (not shown) for effectuating rotation of the solar modules 1002 during tracking of the sun. As can be appreciated, a gap or other interruption is formed between adjacent solar modules which may interfere with and inhibit movement of the cleaning equipment 2000 thereacross. A slew drive bridge 300 is provided at these locations to enable the cleaning equipment 2000 to traverse the gap formed between adjacent solar modules 1002 adjacent the slew drive.

Due to the large size of the row of solar modules 1002, it is necessary to limit the overall length of a row of interconnected solar modules 1002. Accordingly, a gap is formed between adjacent rows of interconnected solar modules 1002 which may interfere with and inhibit movement of the cleaning equipment 2000 thereacross. To enable the transition of the cleaning equipment 2000 from one row to the next, a row-to-row bridge 600 is provided.

With reference to FIGS. 2 and 2A, the docking station 10 includes a frame 20 and a base 40 that is configured to support the frame. The frame 20 includes a pair of longitudinal beams 22, a transverse beam 24, a mid-beam 26, first struts 28, second struts 30, and a pair of brush supports 32.

The pair of longitudinal beams 22 is disposed in spaced relation to one another and extend along a length of the solar tracking system 1000 (FIG. 1) between opposed first and second end portions 22a and 22b, respectively. The pair of longitudinal beams 22 is arranged in a parallel configuration and is spaced apart from the other a distance such that each beam of the pair of longitudinal beams 22 is substantially aligned with an outer edge 1002a of the solar modules 1002 of the solar tracking system 1000 to enable a smooth transition of the cleaning equipment 2000 from the solar modules 1002 to the frame 20, as will be described in further detail hereinbelow. In embodiments, the pair of longitudinal beams 22 may be arranged in any suitable configuration capable of receiving the cleaning equipment 2000, such as non-parallel or the like.

Although generally illustrated as being a box tube, it is contemplated that the pair of longitudinal beams 22 may be any suitable beam capable of supporting a weight of the cleaning equipment 2000, such as C-channel, I-beams, H-beams, circular or round beams, etc. In embodiments, each beam of the pair of longitudinal beams 22 may include the same profile or may include different profiles, depending upon the installation needs of the docking station 10.

The transverse beam 24 is coupled to the first end portion 22a of each of the pair of longitudinal beams 22 and extends between opposed first and second end portions 24a and 24b, respectively, along a width of the solar tracking system 1000. It is contemplated that the transverse beam 24 may be coupled to the first end portion 22a of each of the pair of longitudinal beams 22 using any suitable means, such as fasteners, welding, adhesives, amongst others. In one non-limiting embodiments, the transverse beam 24 is welded to the first end portion 22a of each of the pair of longitudinal beams 22.

The transverse beam 24 includes a length such that the opposed first and second end portions 24a, 24b extend past each of the pair of longitudinal beams 22, although it is envisioned that the transverse beam 24 may include any suitable length, such that the opposed end portions 24a, 24b extend any suitable distance from each of the pair of longitudinal beams 22 or terminate at each of the pair of longitudinal beams 22 (e.g., the opposed first and second end portions 24a, 24b are flush with the pair of longitudinal beams 22).

Although generally illustrated as being a box tube, it is contemplated that the transverse beam 24 may be any suitable beam capable of supporting a weight of the cleaning equipment 2000, such as C-channel, I-beams, H-beams, circular or round beams, etc., and may be the same or different than the profile of the pair of longitudinal beams 22.

The mid-beam 26 extends between opposed first and second end portions 26a and 26b, respectively, along a width of the solar tracking system 1000. The mid-beam 26 is interposed between the pair of longitudinal beams 22 such that the first and second end portions 26a, 26b of the mid-beam abut a corresponding portion of each of the pair of longitudinal beams 22. The mid-beam 26 is disposed at a location that is between the first and second end portions 22a, 22b of the pair of longitudinal beams 22 to provide additional support to the frame 20. Although generally illustrated as being closer to the second end portion 22b of the pair of longitudinal beams 22, it is contemplated that the mid-beam 26 may be disposed at any suitable location therebetween.

It is contemplated that the transverse beam 24 may be coupled to the first end portion 22a of each of the pair of longitudinal beams 22 using any suitable means, such as fasteners, welding, adhesives, amongst others. In one non-limiting embodiments, the transverse beam 24 is welded to the first end portion 22a of each of the pair of longitudinal beams 22. Although generally illustrated as being a box tube, it is contemplated that the mid-beam 26 may be any suitable beam capable of supporting a weight of the cleaning equipment 2000, such as C-channel, I-beams, H-beams, circular or round beams, etc., and may be the same or different than the profile of the pair of longitudinal beams 22 and the transverse beam 24.

The first strut 28 defines an elongate body extending between opposed first and second end portions 28a and 28b, respectively. The first end portion 28a of the first strut 28 is coupled to a portion of the transverse beam 24 adjacent the first end portion 24a and the second end portion 28b of the first strut 28 is coupled to a portion of the base 40. The first strut 28 is oriented relative to each of the transverse beam 24 and the base 40 at an angle (e.g., diagonal) to triangulate or otherwise form a triangle shape between each of the transverse beam 24, the first strut 28, and the base 40 to inhibit rotation of the frame 20 about the base 40 and to increase the stiffness of the transverse beam 24.

The second strut 30 is substantially similar to the first strut 28 except that the second strut includes a length that is greater than the first strut. In this manner, the second strut 30 is coupled to the base at a first end portion 30a and is coupled to the transverse beam 24 adjacent the second end portion 24b to triangulate or otherwise form a triangle (e.g., disposed diagonal) shape between each of the transverse beam 24, the second strut 30, and the base 40 to inhibit rotation of the frame 20 about the base 40 and to increase the stiffness of the transverse beam 24. The second strut 30 includes a length that is greater than a length of the first strut such that the frame 20 is oriented at an angle relative to a vertical axis "Y" and is substantially similar to an angle of the solar modules 1002 when the solar modules 1002 are placed in a stow position. In embodiments, the angle of the frame 20 relative to the vertical axis "Y" is 30 degrees. It is contemplated that an angle at which the frame 20 is oriented relative to the solar modules 1002 may differ by ±2 degrees to ensure that the cleaning equipment 2000 may transition from the solar modules 1002 to the frame 20 without being dislodged or be jammed, rendering the cleaning equipment 2000 inoperable.

The first and second struts 28, 30 are arranged in pairs such that each of the transverse beam 24 and the mid-beam 26 include a corresponding pair of first and second struts 28, 30 to increase the stiffness of the frame from bending and/or rotation relative to the base 40. Although generally illustrated as being a box tube, it is contemplated that each of the first and second struts 28, 30 may be any suitable beam capable of supporting a weight of the cleaning equipment 2000, such as C-channel, I-beams, H-beams, circular or round beams, etc., and may be the same or different than one another or the same of different than the profile of the pair of longitudinal beams 22, the transverse beam 24, or the mid-beam 26.

The pair of brush supports 32 are substantially similar and therefore only one brush support 32 will be described in detail hereinbelow in the interest of brevity. The brush support 32 includes an L-shaped profile disposed in an inverted orientation. In this manner, the brush support 32 includes a first leg 34 terminating at an end portion 34a and a second leg 36 coupled to the first leg 24 and terminating at an end portion 36a. The end portion 34a of the first leg 34 is coupled to the transverse beam 24 adjacent the first end portion 24a thereof such that the second leg 36 extends along the length of the solar tracking system 1000. Although illustrated as being disposed adjacent a location where the first end portion 28a of the first strut 28 is coupled to the transverse beam 24, it is contemplated that the brush support 32 may be coupled to the transverse beam 24 at any suitable location. It is envisioned that the brush support 32 may be coupled to the transverse beam 24 using any suitable means, such as such as fasteners, welding, adhesives, amongst others. In one non-limiting embodiments, the end portion 32a of the brush support 32 is welded to the transverse beam 24. The pair of brush supports 32 cooperate to provide support to one or more brushes (not shown) of the cleaning equipment 2000 when the cleaning equipment 2000 is supported on the frame 20.

Continuing with FIGS. 2 and 2A, the base 40 defines a generally C-shaped profile, although it is contemplated that the base may be any suitable beam capable of supporting the frame 20, such as box beams, I-beams, H-beams, etc. The base 40 extends between a first end portion 40a that is configured to be anchored in the ground and an opposite, second end portion 40b that is configured to support the frame 20. In this manner, a pair of flanges 42a and 42b is coupled to opposed sides of the base 40 such that each of the pair of flanges 42a, 42b is disposed in juxtaposed relation to one another. Although generally illustrated as being disposed at a midpoint between the first and second opposed end portions 40a, 40b of the base 40, it is contemplated that the pair of flanges 42a, 42b may be disposed at any location along the length of the base 40, and each of the pair of flanges 42a, 42b may be disposed at similar or different locations along the length thereof (e.g., mirrored or staggered, etc.). Each of the pair of flanges 42a, 42b is configured to be coupled to a respective second end portion 28b, 30b of the first and second struts 28, 30, respectively. Although generally illustrated as being coupled to the first and second struts 28, 30 using fasteners, it is contemplated that the pair of flanges 42a, 42b may be coupled to each of the first and second struts 28, 30 using any suitable means, such as welding, adhesives, amongst others. In embodiments, the base 40 may not include flanges, or may include only one flange of the pair of flanges 42a, 42b.

The base 40 includes an upper bracket 44 coupled to the second end portion 40b and extending therefrom. The upper bracket 44 is configured to be operably coupled to a portion of the transverse beam 24 and thereby support the frame 20 on the base 40. As can be appreciated, the pair of lower flanges 42a, 42b cooperate with the first and second struts 28, 30 to maintain the frame 20 at an angle relative to a vertical axis "Y" that is substantially similar to an angle of the solar modules 1002 when the solar modules 1002 are placed in a stow position. In embodiments, the base 40 maintains the frame 20 a distance from the adjacent solar modules 1002 such that the solar modules 1002 may articulate relative to the docking station 10. In this manner, as the solar modules 1002 are caused to articulate during the course of a day, the solar modules 1002 are permitted to articulate relative to the docking station 10, which remains stationary and enables the solar modules 1002 to be unencumbered while articulating. In embodiments, the distance between the respective end portions 22b of the pair of longitudinal beams 22 and the solar module is between 0 mm and 100 mm to ensure that the cleaning equipment 2000 may transition from the solar modules 1002 to the frame 20 without being dislodged or be jammed, rendering the cleaning equipment 2000 inoperable.

With additional reference to FIG. 2B, it is envisioned that the docking station 10 may include a photovoltaic module 50 (e.g., solar cell) disposed thereon to generate additional energy during times when the cleaning equipment 2000 is not stowed on docking station 10. In embodiments, the photovoltaic module 50 may be utilized to generate energy to charge batteries (not shown) or other energy storage devices associated with the cleaning equipment 2000. It is contemplated that the photovoltaic module 50 is interposed between each of the pair of longitudinal beams 22, the transverse beam 24, and mid-beam 26 (e.g., in the open spaced defined within the frame 20). As can be appreciated, the photovoltaic module 50 may be disposed at any location within the open space within the frame 20, and may include any suitable length and width, depending upon the design needs of the docking station 10. In one non-limiting embodiment, the photovoltaic module 50 includes a length and width that is less than a length and width of the frame 20 and is disposed adjacent the mid-beam 26. The frame 20 includes an additional beam 52 that extends between and is coupled to each of the pair of longitudinal beams 22. In this manner, the photovoltaic module 50 is coupled to each of the mid-beam 26 and the beam 52 using any suitable means, such as fasteners, welding, adhesives, amongst others.

With reference to FIG. 2C, it is contemplated that an additional photovoltaic module 60 may be disposed on the pair of brush supports 32 to generate additional energy during time the cleaning equipment 2000 is stowed on the docking station 10. It is envisioned that the photovoltaic module 60 may include any suitable dimension and may be coupled to the pair of brush supports 32 using any suitable means, such as fasteners, welding, adhesives, amongst others.

Turning to FIG. 2D, it is contemplated that docking station 10 may include one or more wind protection plates 70 and 72. The wind protection plates 70, 72 shelter or otherwise inhibit wind loads from acting on the cleaning equipment 2000 when the cleaning equipment 2000 is stowed on the docking station 10. In this manner, the wind protection plate 70 is disposed on a portion of the pair of brush supports 32 using any suitable means, such as fasteners, welding, adhesives, amongst others and the wind protection plate 72 is disposed within the open spaced formed within the frame 20. It is envisioned that the wind protection plate 72 may be coupled to the frame 20 using any suitable means, such as fasteners, welding, adhesives, amongst others. It is contemplated that the wind protection plates may be formed from any suitable material, such as metallic (e.g., steel, aluminum, etc.) and non-metallic (e.g., polymers, ceramics, etc.) materials depending upon the design needs of the docking station 10.

Figures 2F, 2G, 2H:
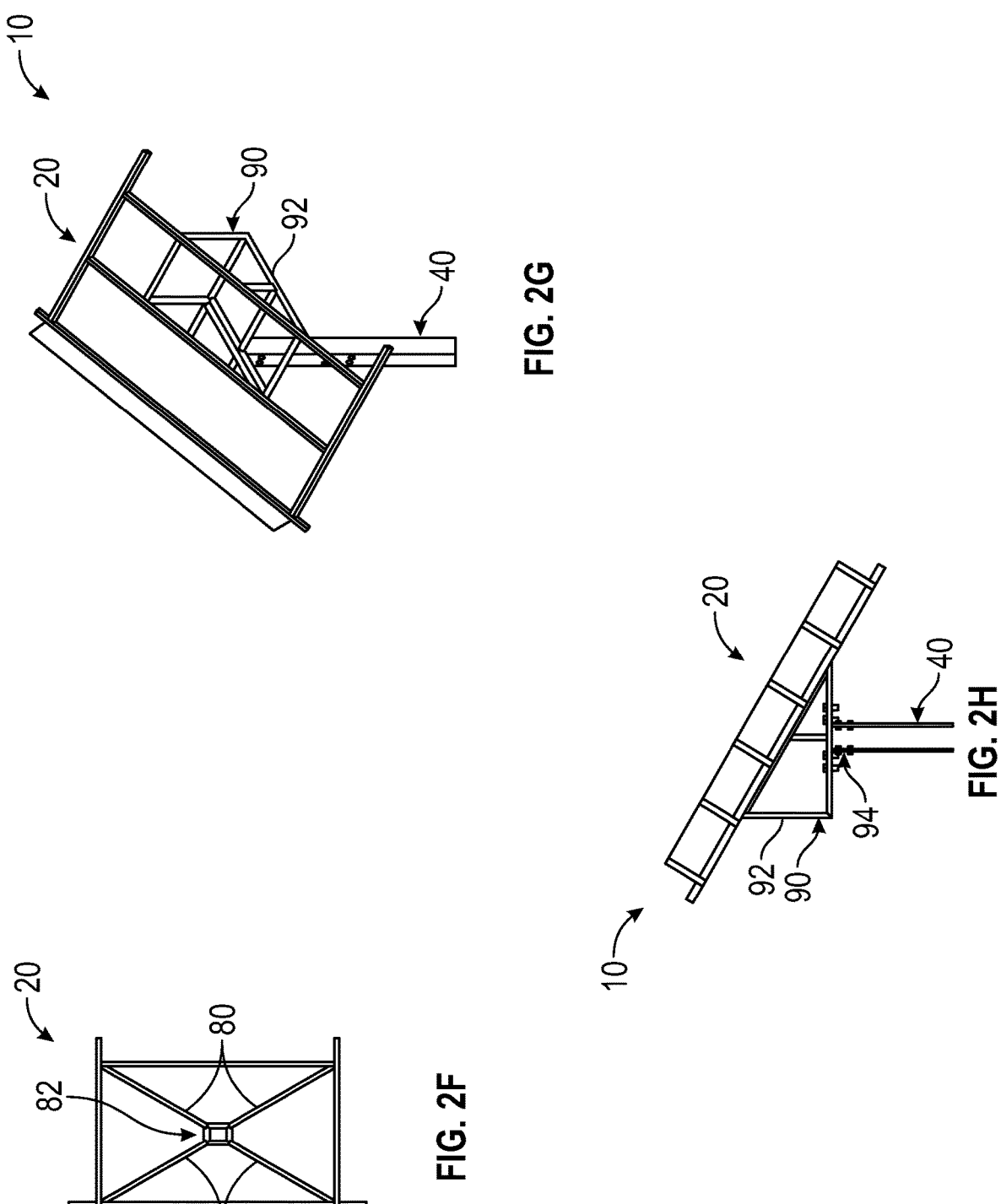
FIG. 2F is a plan view of the docking station of FIG. 2E.
FIG. 2G is a perspective view of an alternative embodiment of the docking station of FIG. 2 having a single base.
FIG. 2H is an elevation view of the docking station of FIG. 2G.

With additional reference to FIGS. 2E and 2F, it is envisioned that the frame 20 may be disposed on a single base 40. In this manner, the frame 20 is coupled to the base 40 using a plurality of struts 80 extending from the base to a respective portion of the frame 20. In one non-limiting embodiment, the frame 20 is supported on the base 40 using four struts 80, each coupled to a respective corner of the frame 20. In embodiments, the struts 80 may be coupled to a coupling 82 having an interior profile that is complementary to that of the base 40 (e.g., a square or rectangular profile). It is envisioned that the coupling 82 may be coupled to the base 40 using any suitable means, such as fasteners, welding, adhesives, amongst others. It is contemplated that the angle formed between the struts 80 and the base 40 may be altered depending upon the overall size of the frame 20 and the height at which the frame 20 is disposed above the base 40.

With reference to FIGS. 2G and 2H, another embodiment of the docking station 10 having the frame 20 supported by a single base 40 is illustrated. The frame 20 is supported on the base 40 using a support frame 90 having a generally triangular profile such that the frame 20 is supported on the base at an angle relative thereto (e.g., not perpendicular to the base 40). It is contemplated that the support frame 90 may include any number of beams 92 and may be coupled to the base 40 using any suitable means, such as fasteners, welding, adhesives, amongst others. In one non-limiting embodiment, the support frame 90 is coupled to the base 40 using one or more brackets 94, such as angle brackets, U-brackets, amongst others.

Figure 3:
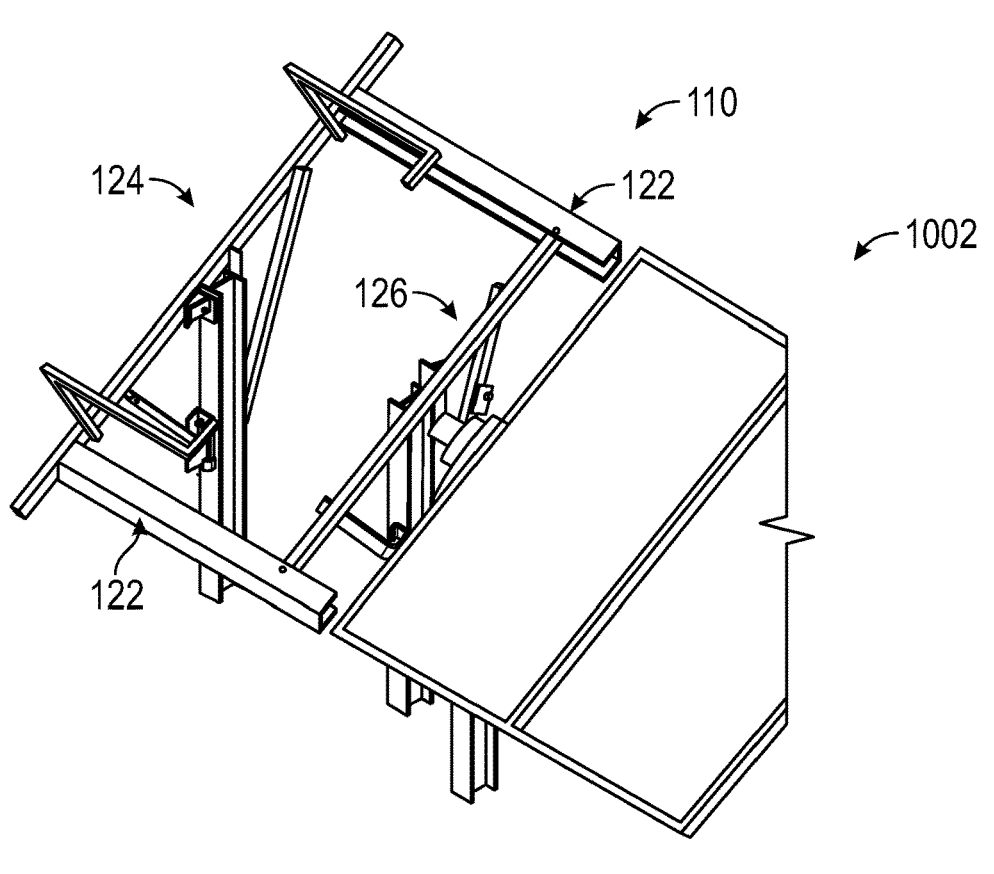
FIG. 3 is a perspective view of a flexible length docking station in accordance with the present disclosure.

With additional reference to FIGS. 3-4A, another embodiment of a docking station is illustrated and generally identified by reference numeral 110. The docking station 110 is substantially similar to the docking station 10 described hereinabove, and therefore, only the differences therebetween will be described in detail in the interest of brevity.

The pair of longitudinal beams 122 include a generally C-shaped profile and each is disposed in a juxtaposed relation to one another such that the open side portion 122c of the C-shaped profile is facing one another (e.g., towards an interior portion of the frame 120). A gusset 122d (FIG. 4A) or bracket is disposed within the open side portion 122c and adjacent the first end portion 122a of each of the pair of longitudinal beams 122. The gusset 122d includes a generally right triangular profile, although other suitable profiles are contemplated. A first side 122e of each of the gussets 122d is coupled to each respective longitudinal beam 122 and a second side 122f of each of the gussets 122d is coupled to a respective portion of the transverse beam 124, as will be described in further detail hereinbelow. It is contemplated that each gusset 122d may be coupled to each respective longitudinal beam 122 and transverse beam 124 using any suitable means, such as such as fasteners, welding, adhesives, amongst others.

Continuing with FIGS. 3-4A, the transverse beam 124 is substantially similar to the transverse beam 24 of the docking station 10 except that the transverse beam 124 includes a first plurality of holes 124c defined therethrough adjacent the first end portion 124a and a second plurality of holes 124d defined therethrough adjacent the second end portion 124b. Each of the first and second plurality of holes 124c, 124d defines a plurality of columns of holes having a pair of holes in each column, although it is contemplated that each column may include any suitable number of holes, such as one, three, four, etc. Each of the first and second plurality of holes 124c, 124d extend longitudinally along the transverse beam 124 defining a plurality of locations at which the pair of longitudinal beams 122 may be selectively coupled, thereby altering a distance from one another the pair of longitudinal beams 122 may be spaced (e.g., further or closer to one another). In this manner, each respective gusset 122d is coupled to a respective column of holes of the first and second plurality of holes 124c, 124d, to place the pair of longitudinal beams 122 at the desired location depending upon the type of cleaning equipment 2000 being used or the installation requirements of the solar modules 1002.

The mid-beam 126 of the docking station 110 is substantially similar to the mid-beam 26 of the docking station 10 except that the mid-beam 126 includes a generally C-shaped profile and a pair of telescoping brackets 126c. Each of the pair of telescoping brackets 126c includes a generally C-shaped profile and is disposed adjacent a respective first and second end portion 126a, 126b of the mid-beam 126 and is slidably received within an interior portion 126d of the C-shaped profile of the mid-beam 126. In this manner, the pair of telescoping brackets 126c is permitted to selectively slide relative to the mid-beam 126 to alter an overall length of the mid-beam 126 such that each of the pair of telescoping brackets 126c, and thereby the mid-beam 126, may be coupled to the pair of longitudinal beams 122 regardless of the distance at which each beam of the pair of longitudinal beams 122 is spaced from one another. In embodiments, the pair of telescoping brackets 126c enable the overall length of the mid-beam 126 to vary between about 2000 mm and about 2400 mm, although any suitable length is contemplated depending upon the design needs of the docking station 110.

To accommodate the varying positions at which each of the pair of telescoping brackets 126c may be disposed relative to the mid-beam 126, the mid-beam 126 includes a plurality of holes 126e defined therethrough adjacent each respective end portion 126a, 126b. Similarly, each of the pair of telescoping brackets 126c includes a corresponding plurality of boreholes (not shown) defined therethrough such that the pair of telescoping brackets 126c may be selectively coupled to the mid-beam 126 at a desired location to define a desired overall length of the mid-beam 126 including the pair of telescoping brackets 126c using any suitable means, such as fasteners, rivets, etc. Although generally described has having a plurality of holes 126e and a plurality of boreholes, it is envisioned that the mid-beam 126 may include a single hole adjacent each end portion 126a, 126b and the pair of telescoping brackets 126c may include a plurality of boreholes or vice versa depending upon the design needs of the docking station 110. Although generally illustrated as having a C-shaped profile (e.g., a C-channel), it is contemplated that the mid-beam 126 and the pair of telescoping brackets 126c may include any suitable profile, such as a box tube, an I-beam, an H-beam, etc. and may include the same or different profiles. In embodiments, the mid beam 126 may define a box shaped profile (e.g., box tube) defining a hollow interior portion extending therethrough that is configured to receive a detent mechanism or other similar device, such as the detent mechanism 736 illustrated in FIGS. 18, 19, and 19A herein.

Figures 5, 5A, 6:
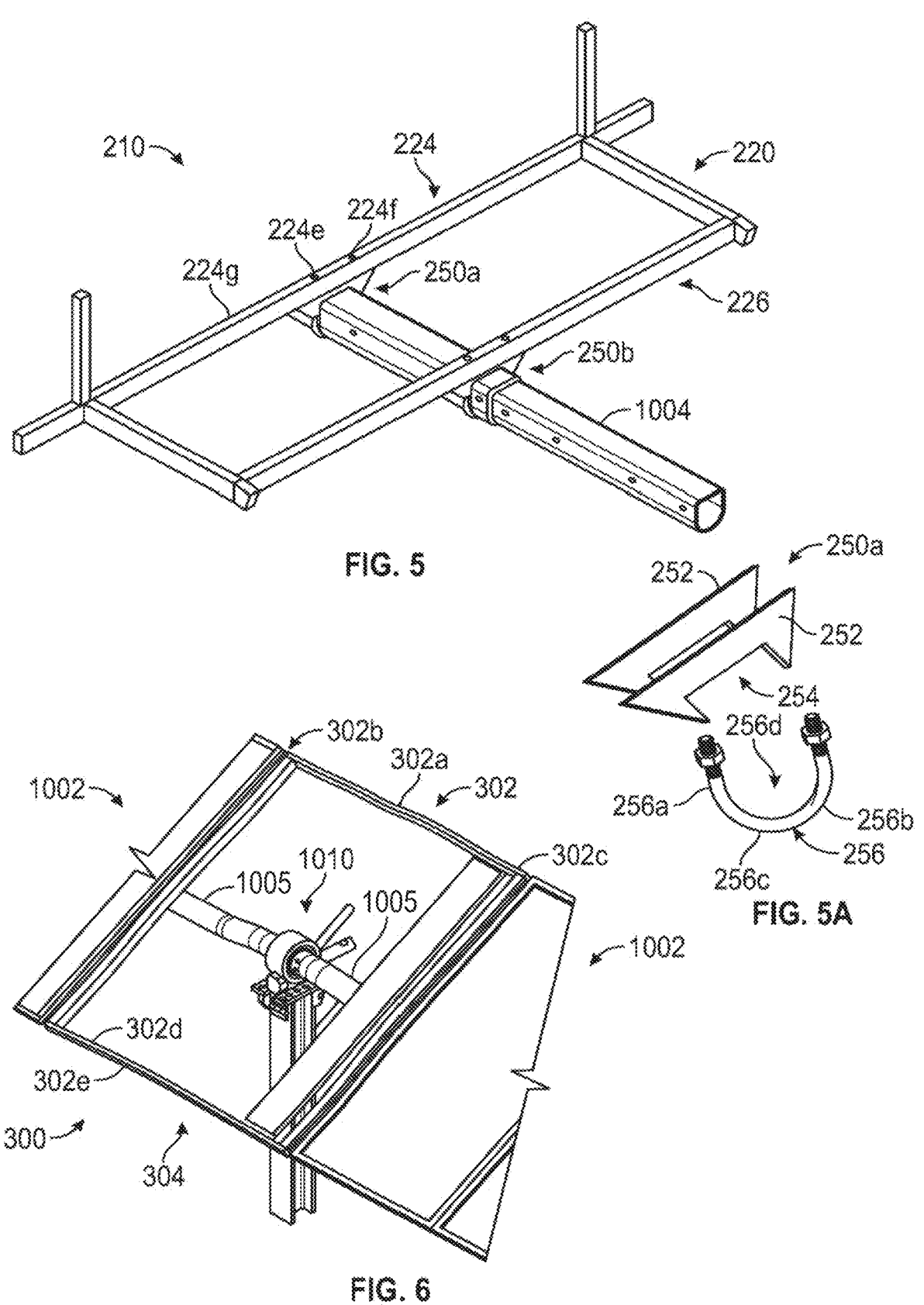
FIG. 5 is a perspective view of another embodiment of a docking station in accordance with the present disclosure.
FIG. 5A is as perspective view of a bracket of the docking station of FIG. 5.
FIG. 6 is a perspective view of a slew drive bridge in accordance with the present disclosure.

Turning to FIGS. 5 and 5A, another embodiment of a docking station is illustrated and generally identified by reference numeral 210. The docking station 210 is substantially similar to the docking station 10 except the docking station 210 is coupled to a torque tube extension 1004 of a torque tube (not shown) of the solar tracking system 1000. Accordingly, only the differences between the docking station 210 and the docking station 10 will be described in further detail herein in the interest of brevity.

The docking station 210 includes a pair of brackets 250*a* and 250*b*, respectively. The first bracket 250*a* of the pair of brackets is coupled to a portion of the transverse beam 224 and a second bracket 250*b* of the pair of brackets is coupled to a portion of the mid-beam 226. Each of the pair of brackets 250*a*, 250*b* is substantially similar to one another and therefore only one bracket of the pair of brackets 250*a*, 250*b* will be described herein in the interest of brevity.

The first bracket 250*a* includes a pair of gussets 252 disposed on a portion of the transverse beam 224 using any suitable means, such as welding, adhesives, fasteners, etc. Although generally illustrated as being disposed at a mid-portion of the transverse beam 224, it is contemplated that the pair of gussets 252 may be disposed at any location along the length of the transverse beam 224, and in embodiments, is disposed at a similar location to a center of rotation of the adjacent solar modules 1002 of the solar tracking system 1000. It is envisioned that the first bracket 250*a* may be formed monolithically and the pair of gussets 252 may be formed by bending or otherwise plastically deforming the first bracket 250*a*. Each of the pair of gussets 252 includes a notch 254 formed therein that is configured to receive a portion of the torque tube extension 1006 therein. In this manner the notch 254 defines a width that is substantially similar to a width of the torque tube extension 1004 such that the first bracket 250*a* is permitted to translate (e.g., slide) along a length of the torque tube extension 1004 but is inhibited from translating transverse to the torque tube extension 1004.

Continuing with FIG. 5A, the first bracket 250*a* includes a fastener 254 that is configured to fixedly couple the frame 220 of the docking station 210 to the torque tube extension 1004. It is contemplated that the fastener 256 is a U-bolt or other similar fastener having a pair of legs 256*a* and 256*b* extending from a backspan 256*c*. In this manner, the torque tube extension 1004 is received within a gap 256*d* formed between the pair of legs 256*a*, 256*b* and the pair of legs 256*a*, 256*b* is received within a respective pair of holes 224*e* and 224*f* formed through the transverse beam 224. A portion of each of the pair of legs 256*a*, 256*b* of the fastener 256 extend past an upper surface 224*g* of the transverse beam 224 and is configured to threadably engage a respective pair of nuts (not shown), respectively. As can be appreciated, the torque tube extension 1004 is interposed (e.g., sandwiched) between the pair of gussets 252 and the backspan 256*c* of the fastener 256. In this manner, as the pair of nuts is tightened and draws the fastener 256 towards the pair of gussets 252, the torque tube extension 1004 is squeezed or otherwise clamped therebetween and inhibited from translating relative to the first bracket 250*a*.

In operation, the torque tube extension 1004 is fixedly coupled to torque tube (not shown) of the solar tracking system 1000 using any suitable means (e.g., fasteners, welding, adhesives, amongst others) such that as the torque tube of the solar tracking system 1000 is caused to rotate and otherwise track a location of the sun, rotation of the torque tube effectuates a corresponding rotation of the torque tube extension 1004, and thereby the docking station 210, such that the solar modules 1002 and the docking station rotate in unison. As can be appreciated, by being aligned with, and rotating in unison with, the adjacent solar module 1002, the docking station 210 enables the cleaning equipment 2000 to transition from the adjacent solar module 1002 to the docking station 210 at any time, regardless of the position of the solar module 1002. As such, there is no need to wait until the solar module 1002 is placed in a stow position before the cleaning equipment 2000 can transition from the solar module 1002 to the docking station 210.

Although generally described as having only one docking station 210, it is contemplated that each row of solar modules 1002 of the solar tracking system 1000 may include a pair of docking stations 210, with each docking station 210 of the pair of docking stations disposed on opposed end portions of the row of solar modules 1002. In this manner, the cleaning equipment 2000 has more flexibility when being parked on a docking station 210, such that the cleaning equipment 2000 may only have to traverse the row of solar modules 1002 once in order to reach a docking station 210, rather than having to traverse the row of solar modules 1002 a second time to return to a single docking station 210.

Figures 7, 7A, 8:
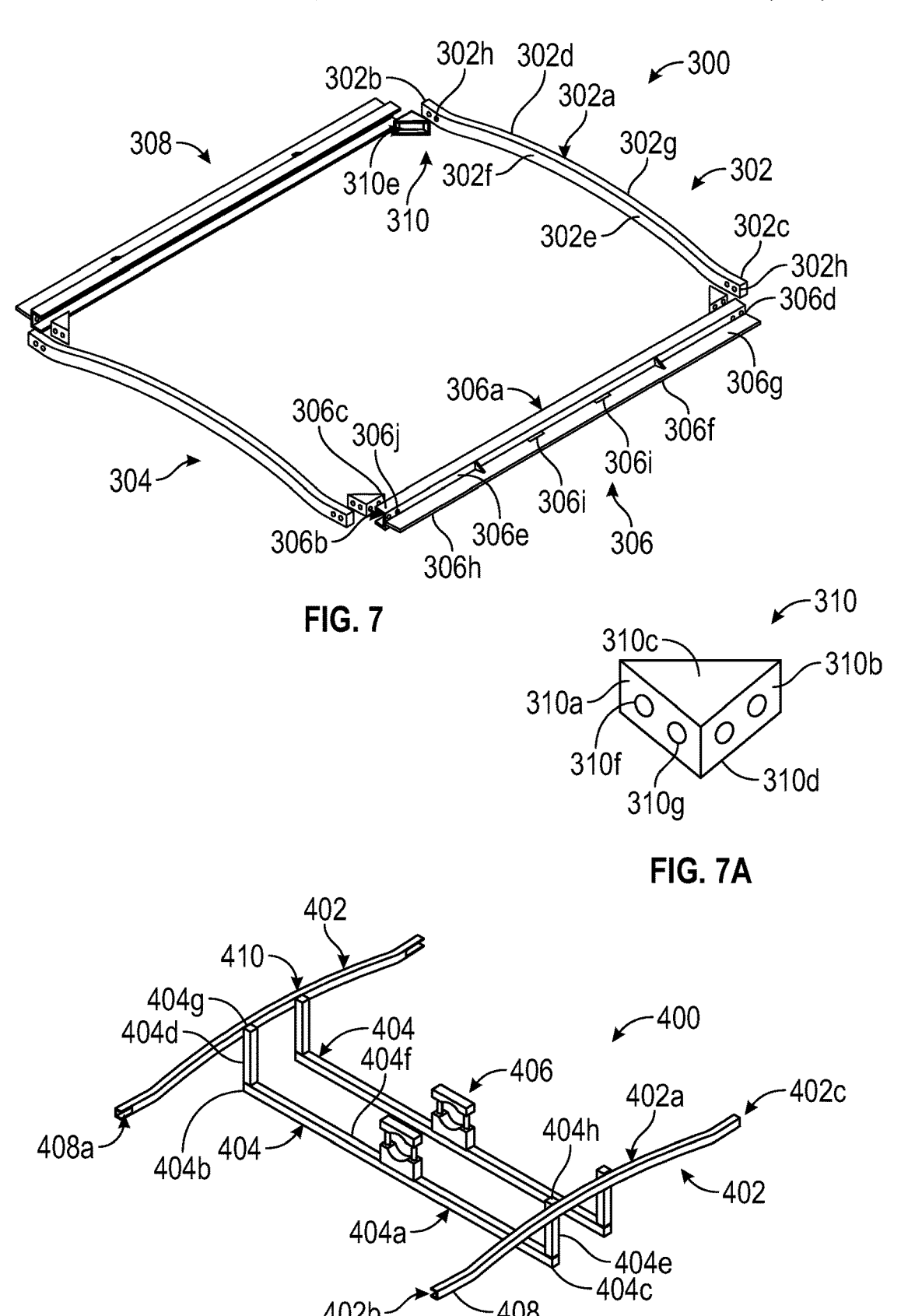
FIG. 7 is an exploded view of the slew drive bridge of FIG. 6.
FIG. 7A is a perspective view of a gusset of the slew drive bridge of FIG. 6.
FIG. 8 is a perspective view of a slew gear bridge in accordance with the present disclosure.

Turning to FIGS. 6-7A, a slew drive bridge is illustrated and generally identified by reference numeral 300. As can be appreciated, rotation of the solar modules 1002 of the solar tracking system 1000 requires a significant amount of torque, necessitating many individual slew gears or slew drives 1010. The slew drives 1010 are interposed between adjacent solar modules 1002 and the torque tube 1005 of each respective solar module 1002 is coupled to the slew drive 1010 such that the slew drive 1010 effectuates rotation of each of the torque tubes 1005, and therefore, each respective solar module 1002. As the slew drive 1010 is interposed between adjacent solar modules 1002, a gap exists between each adjacent solar module 1002, inhibiting the cleaning equipment 2000 from freely and safely transitioning from one solar module 1002 to the other at each slew drive 1010 location.

The slew drive bridge 300 is configured to form a bridge between each adjacent solar module 1002 to enable the cleaning equipment 2000 to transition from one solar module 1002, over the slew drive 1010, and onto an adjacent solar module 1002. The slew drive bridge 300 includes a pair of parallel beams 302 and 304, respectively, a pair of transverse beams 306 and 308, respectively, and a plurality of gussets 310.

Each beam of the pair of parallel beams 302, 304 is substantially similar, and therefore, only one parallel beam 302 of the pair of parallel beams 302, 304 will be described in detail herein in the interest of brevity. The parallel beam 302 defines an elongate body 302*a* extending between opposed first and second end portions 302*b* and 302*c*, respectively. The elongate body 302*a* includes an upper surface 302*d* and an opposite lower surface 302*e*, each extending between opposed first and second side surfaces 302*f* and 302*g*, respectively, and the first and second end portions 302*b*, 302*c*. The upper and lower surfaces 302*d*, 302*e* define a generally arcuate shape (e.g., an arch or the like) extending between the first and second end portions 302*b*, 302*c*, where a center portion of the elongate body 302*a* is higher than each of the first and second end portions 302*b*, 302*c*. As can be appreciated, the arcuate profile of the elongate body 302*a* provides clearance for the slew drive 1010 as the cleaning equipment 2000 passes thereover on the slew drive bridge 300. In embodiments, it is contemplated that the elongate body 302a may define any suitable shape, such as a trapezoid, planar, amongst others, depending upon the design needs of the slew drive bridge 300. Although generally illustrated as defining a rectangular tube profile, it is envisioned that the elongate body 302a may define any suitable profile, such as a box tube, round tube, a solid structure, C-channel, H-channel, amongst others.

A pair of through-holes 302h is formed through the opposed first and second side surfaces 302f, 302g adjacent each of the respective first and second end portions 302b, 302c. Each respective pair of through-holes 302h is configured to receive a fastener therethrough, such as a bolt, rivet, etc., to couple the parallel beam 302 to a respective gusset 310, as will be described in further detail hereinbelow.

With continued reference to FIGS. 6-7A, each of the pair of transverse beams 306, 308 is substantially similar and therefore only one transverse beam 306 will be described in detail hereinbelow in the interest of brevity. The transverse beam 306 includes an elongate body 306a defining a generally C-shaped profile having a channel 306b defined therein and extending through opposed first and second end portions 306c and 306d, respectively. The channel 306b is configured to receive a gusset 310 therein, as will be described in further detail hereinbelow. A side surface 306e opposite the channel 306b includes a fin 306f disposed therein and extending therefrom. The fin 306f defines a generally planar profile defining opposed upper and lower surfaces 306g and 306h, respectively, and extending between each of the first and second end portions 306c, 306d. Although generally described as extending between the first and second end portions 306c, 306d, it is contemplated that the fin may extend any length along the elongate body 306a between first and second end portions 306c, 306d, depending upon the design needs of the slew drive bridge 300.

A pair of bores 306i is defined through the upper and lower surfaces 306g, 306h at a center portion of the fin 306f. The pair of bores 306i is configured to receive a corresponding pair of fasteners, rivets, etc. to selectively couple the transverse beam 306 to an adjacent solar module 1002 of the solar tracking system 1000. It is envisioned that the transverse beam 306 may be coupled to the solar module 1002 using any suitable means, such as fasteners, rivets, adhesives, welding, etc., and it is contemplated that any number of fasteners or the like may be utilized to couple the transverse beam 306 to the solar module 1002. A pair of through-bores 306j is formed through the side surface 306e and into the channel 306b adjacent each of the respective first and second end portions 306c and 306d. Each respective pair of through-bores 306j is configured to receive a fastener therethrough, such as a bolt, rivet, etc., to couple the transverse beam 306 to a respective gusset 310, as will be described in further detail hereinbelow.

The gusset 310 defines a generally triangular profile that is configured to be received within a respective channel 306b of a transverse beam 306 and abut a second side surfaces 302f of an adjacent parallel beam 302. In this manner, the gusset 310 defines adjacent first and second side walls 310a and 310b, respectively, that intersect at a generally perpendicular or right angle relative to one another, although it is contemplated that the first and second side walls 310a, 310b may intersect at any suitable angle depending upon the design needs of the slew drive bridge 300. Each of the first and second side walls 310a, 310b extend between opposed upper and lower walls 310c and 310d, respectively, and cooperate to define a cavity 310e (FIG. 7) interposed between each of the first and second sidewalls 310a, 310b, and upper and lower walls 310c, 310d, respectively.

Each of the first and second sidewalls 310a, 310c include a corresponding pair of bores 310f and 310g defined therethrough and extending into the cavity 310e. As can be appreciated each of the pair of bores 310f and 310g is configured to align with a corresponding pair of through-holes 302h of a parallel beam 302 and a corresponding pair of through-bores 306j of an adjacent transverse beam 306. In this manner, a corresponding fastener (not shown) may be received through each respective pair of bores 310f and through holes 302h and pair of bores 310g and through-bores 306j to couple the gusset 310 to the parallel beam 302 and the transverse beam 306. Although generally described as being coupled to the parallel beam 302 and the transverse beam 306 via fasteners, it is contemplated that the gusset 310 may be coupled to the parallel beam 302 and the transverse beam 306 using any suitable means, such as adhesives, welding, and combinations thereof, amongst others. As can be appreciated, the pair of bores 310f and 310g may be coupled to any of the parallel beams 302 and transverse beams 306 depending upon the orientation thereof during assembly.

The configuration of the slew drive bridge 300 provides torsional stability and reduces the load on each of the solar modules 1002 as the cleaning equipment 2000 traverses the slew drive bridge 300 and to an adjacent solar module 1002. As can be appreciated, the fins 306f of the pair of transverse beams 306 positively couples the slew drive bridge 300 to each adjacent solar module 1002 and ensures that during a high wind event, the slew drive bridge 300 remains firmly intact with the solar tracking system 1000. In this manner, the slew drive bridge 300 may serve as a parking spot or docking station for the cleaning equipment 2000 during a high wind event if the cleaning equipment 2000 is unable to safely reach a docking station 10.

Figure 9:
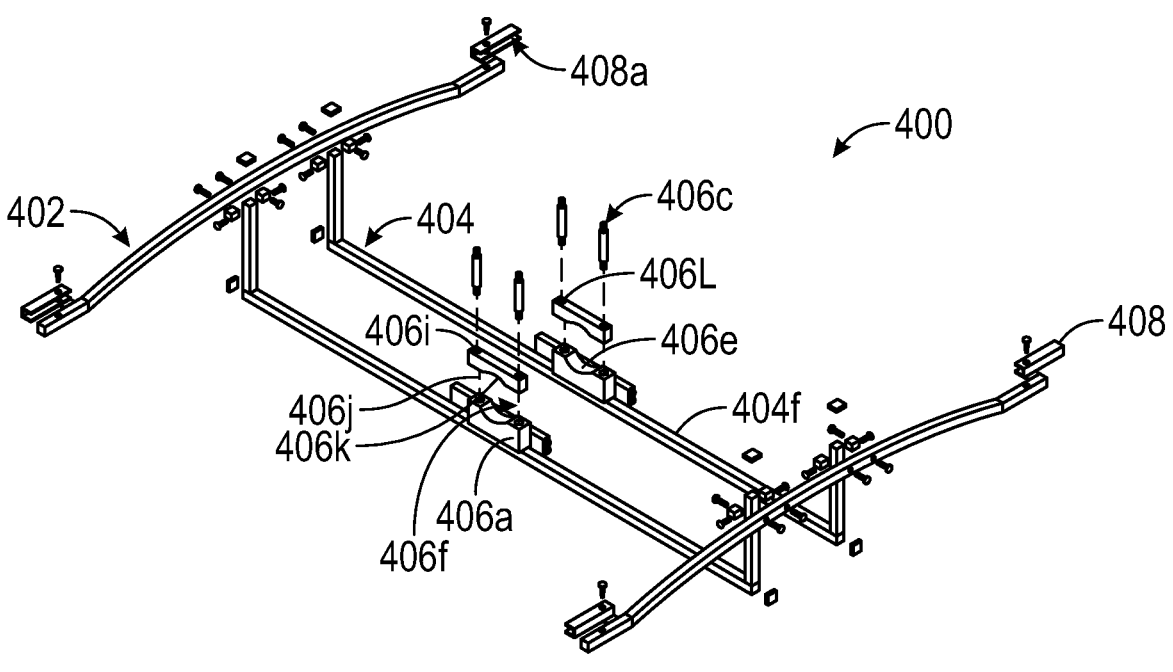
FIG. 9 is an exploded view of the slew gear bridge of FIG. 8.

Turning now to FIGS. 8 and 9, a slew gear bridge is illustrated and generally identified by reference numeral 400. The slew gear bridge 400 includes a pair of transverse beams 402, a pair of parallel beams 404, and a pair of torque tube brackets 406. Each transverse beam of the pair of transverse beams 402 is substantially similar and therefore only one transverse beam 402 will be described in detail herein in the interest of brevity. The transverse beam 402 includes an elongate body 402a extending between opposed first and second end portions 402b and 402c, respectively. Although generally illustrated as having an arcuate profile extending between the first and second end portions 402b, 402c, it is contemplated that the elongate body 402a may include any suitable profile such as planar, trapezoidal, amongst others. The elongate body 402a includes a generally square cross-sectional profile, although it is envisioned that any suitable profile may be utilized, such as circular, triangular, oval, amongst others.

A pair of couplings 408 is coupled to each of the first and second end portions 402b, 402c using any suitable means, such as fasteners, adhesives, welding, amongst others. The pair of couplings 408 include a generally C-shaped profile defining a channel 408a such that a portion of the elongate body 402a of the parallel beam 402 may be received therein adjacent a first end portion and a portion of an adjacent solar module 1002 may receive adjacent a second end portion thereof to couple the slew gear bridge 400 to adjacent solar modules 1002.

Continuing with FIGS. 8 and 9, each of the pair of parallel beams is substantially similar and therefore only one parallel beam 404 will be described herein in the interest of brevity.

The parallel beam 404 defines an elongate body 404a extending between opposed first and second end portions 404b and 404c, respectively. Although generally illustrated as having a square profile, it is contemplated that the parallel beam 404 may include any suitable profile, such as circular, triangular, octagonal, etc. A pair of vertical beams 404d and 404e is disposed on an upper surface 404f of the parallel beam 404 adjacent each of the first and second end portions 404b, 404c. Each of the pair of vertical beams 404d, 404e extends vertically from the upper surface 404f of the parallel beam 404 and terminates at a respective upper surface 404g and 404h. In this manner, the parallel beam 404 defines a generally U-shaped profile. It is contemplated that the pair of vertical beams 404d, 404e may be coupled to the upper surface 404f parallel beam 404 or any suitable portion of the parallel beam using any suitable method, such as fasteners, adhesives, welding, amongst others. In embodiments, the parallel beam 404 and each of the pair of vertical beams 404d, 404e may be a unitary component, where each of the pair of vertical beams 404d, 404e are formed by bending the parallel beam 404.

Each of the pair of vertical beams 404d, 404e is coupled to the transverse beams 402 at a center portion thereof using a bracket 410, although it is contemplated that the pair of vertical beams 404d, 404e may be coupled to the transverse beams 402 without using a bracket, such as directly connecting a portion of each of the vertical beams 404d, 404e to a portion of the transverse beams 402 by welding, adhesives, fasteners, or combinations thereof, amongst others.

Each of the pair of torque tube brackets 406 is substantially similar and therefore only one torque tube bracket 406 will be described herein in the interest of brevity. The torque tube bracket 406 includes a base 406a, an upper clamp 406b, and a fastener 406c. The base 406a defines a generally rectangular profile, although it is contemplated that any suitable profile may be utilized, such as square, oval, circular, amongst others. The base 406a is coupled to the upper surface 404f of the parallel beam 404 at a lower portion thereof 406d using any suitable means, such as welding, adhesives, fasteners, rivets, amongst others. The base 406a defines an upper surface 406e including a cavity 406f defined therein having a concave profile. It is envisioned that the cavity 406f may include any suitable profile, such as triangular, pentagonal, octagonal, amongst others, and in embodiments, may have the same or different profile than that of a torque tube (not shown) of the solar modules 1002. In embodiments, the base 406a is formed from a rectangular tube having a channel (not shown) defined therethrough. As can be appreciated, a nut or other suitable device may be disposed within the channel and threadably engage a portion of the fastener 406c therein that has been received within a corresponding bore (not shown) defined through the upper surface 406e of the base 406a to draw or otherwise cause the upper clamp 406b towards the base 406a and secure a portion of the torque tube of the solar modules 1002 therebetween.

The upper clamp 406b defines a generally rectangular profile having a planar upper surface 406i and an opposite, lower surface 406j. A groove 406k is formed within the lower surface 406j of the upper clamp 406b and defines a generally concave profile, although it is envisioned that the groove 406k may include any suitable profile, such as triangular, pentagonal, octagonal, amongst others, and in embodiments, may have the same or different profile than that of a torque tube (not shown) of the solar modules 1002 or the cavity 406f of the base 406a. The upper clamp 406b includes a pair of throughbores 406L defined through the upper and lower surfaces 406i, 406j that is configured to receive a portion of the fastener 406c therein. In this manner, the fastener 406c is received within the throughbore 406L of the upper clamp 406b and into the channel 406g of the base 406a such that a portion of the fastener 406c may threadably engage the nut. Although generally illustrated as being a pair of bolts, it is contemplated that the fastener 406c may be a U-bolt or any other suitable fastener capable of causing the upper clamp 406b to be drawn towards the base 406a and clamp or otherwise secure the torque tube (not shown) of the solar modules 1002 therein to ensure that the slew gear bridge 400 maintains its position relative to the adjacent solar modules 1002 while stationary as well as when the solar modules 1002 are caused to be rotated to track the location of the sun.

Figure 10:
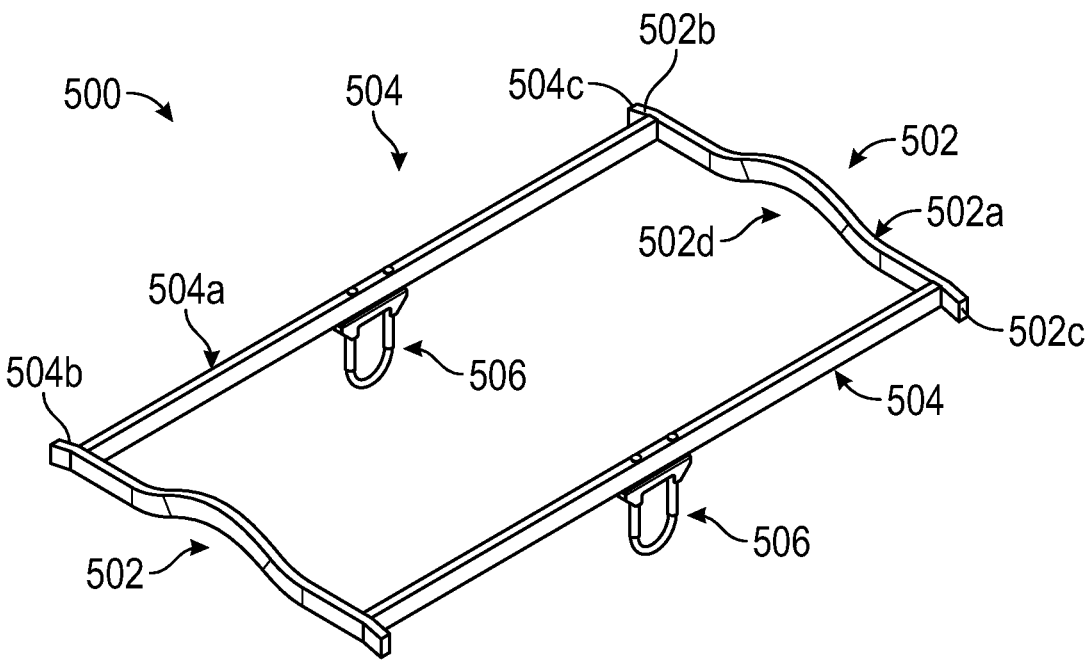
FIG. 10 is a perspective view of another embodiment of a slew gear bridge in accordance with the present disclosure.
Figures 11, 11A, 11B, 12:
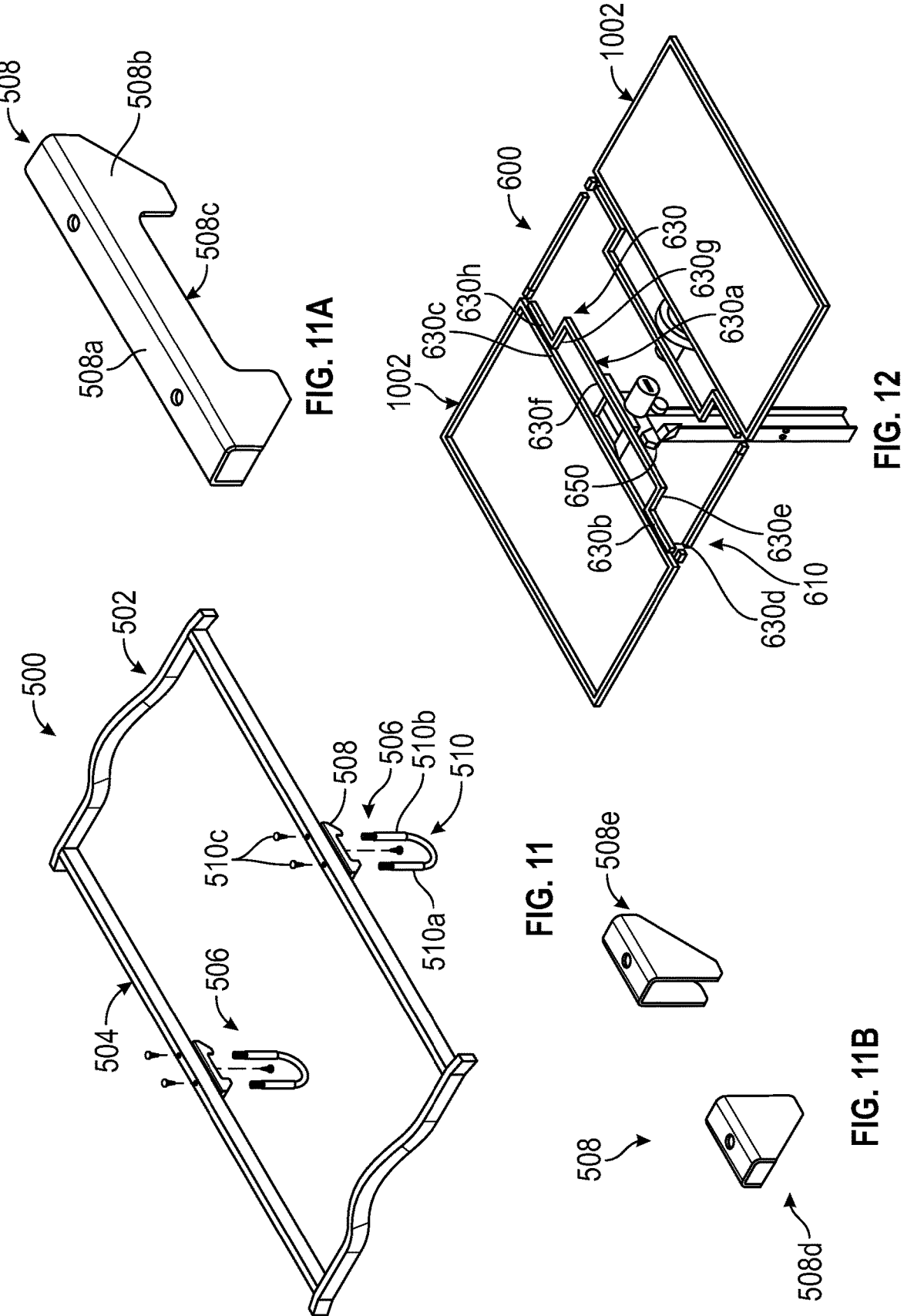
FIG. 11 is an exploded view of the slew gear bridge of FIG. 10.
FIG. 11A is a perspective view of a torque tube clamp of the slew gear bridge of FIG. 10.
FIG. 11B is a perspective view of an alternate embodiment of the torque tube clamp of FIG. 11A.
FIG. 12 is a perspective view of a row-to-row bridge in accordance with the present disclosure.

With reference to FIGS. 10-11A, another embodiment of a slew gear bridge is illustrated and generally identified by reference numeral 500. The slew gear bridge 500 includes a pair of parallel beams 502, a pair of transverse beams 504, and a pair of torque tube clamps 506.

Figures 10A, 10B, 10C, 10D:
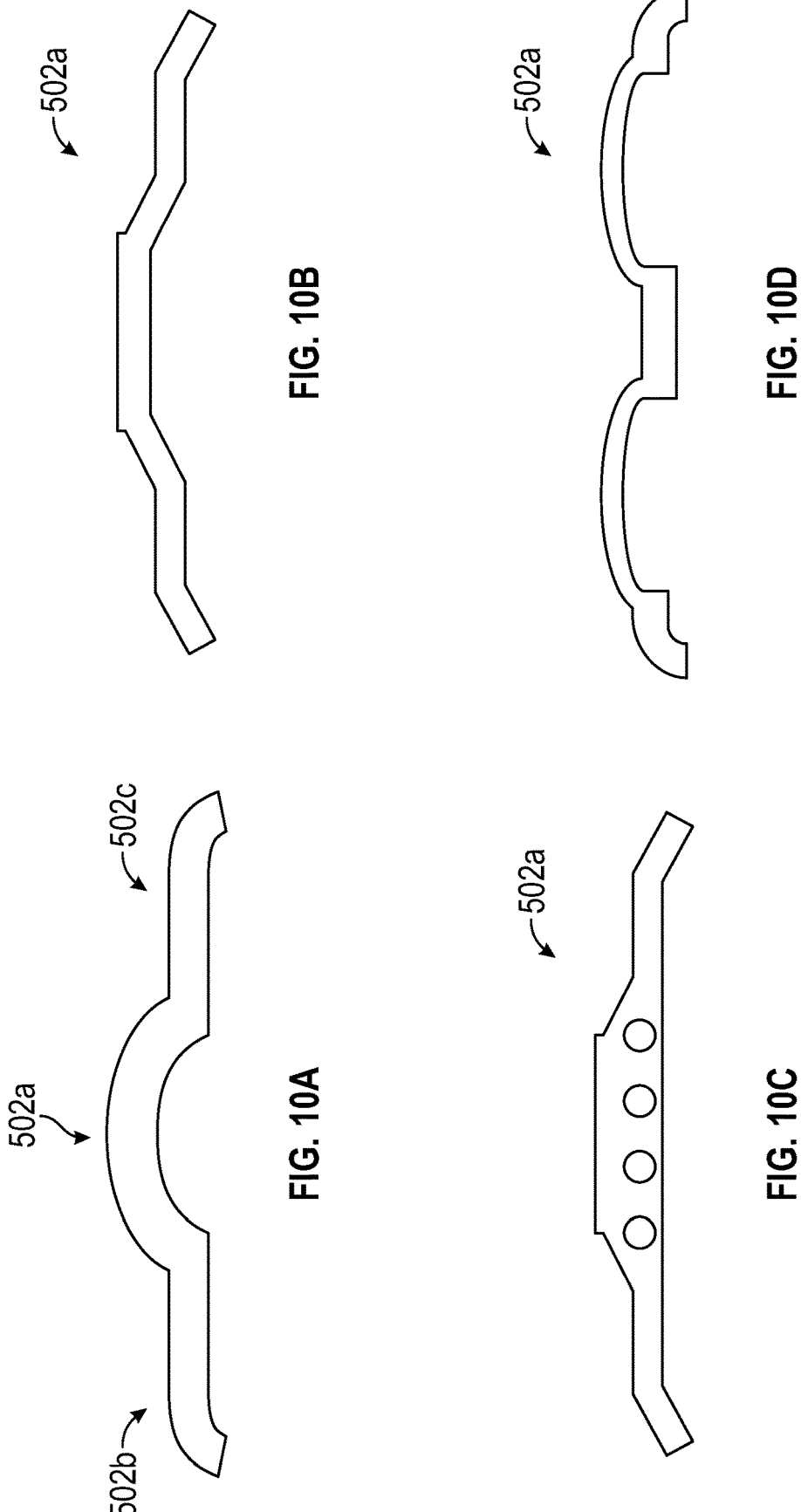
FIG. 10A is an elevation view of a beam of the slew gear bridge of FIG. 10 having arcuate end portions.
FIG. 10B is an elevation view of a beam the slew gear bridge of FIG. 10 having a trapezoidal profile.
FIG. 10C is an elevation view of another beam of the slew gear bridge of FIG. 10 having a trapezoidal profile formed from a plurality of beams.
FIG. 10D is an elevation view of a beam of the slew gear bridge of FIG. 10 having a pair of arcuate profiles.

Each of the pair of parallel beams 502 are substantially similar and therefore only one parallel beam 502 will be described in detail herein in the interest of brevity. The parallel beam 502 includes an elongate body 502a extending between opposed first and second end portions 502b and 502c, respectively. A center portion of the elongate body 502a defines an arcuate profile 502d to provide clearance for the slew gear (not shown) and/or the antenna (not shown) as the cleaning equipment 2000 passes over the slew gear bridge 500. In embodiments, the elongate body 502a may include an arcuate center portion and the first and second end portions 502b, 502c may include an arcuate profile enabling a smooth transition of the cleaning equipment 2000 thereon (FIG. 10A). With reference to FIG. 10B, it is envisioned that the elongate body 502a may have a center portion defining a generally trapezoidal profile. With reference to FIG. 10C, it is contemplated that the elongate body 502a may be formed from a plurality of beams coupled to one another using any suitable means, such as fasteners, welding, adhesives, amongst others. With reference to FIG. 10D, it is envisioned that the elongate beam 502a may include a pair of arcuate profiles.

Although generally illustrated as having a rectangular profile, it is contemplated that the parallel beam 502 may include any suitable profile, such as square, circular, oval, amongst others. In one non-limiting embodiment, the parallel beam 502 is formed from a rectangular tube (e.g., box tubing or the like) having a hollow interior portion.

Each of the pair of transverse beams 504 includes an elongate body 504a extending between opposed first and second end portions 504b and 504c, respectively. Although generally illustrated as having a planar profile, it is contemplated that the elongate body 504a of each of the pair of transverse beams 504 may include any suitable profile, such as arcuate, triangular, amongst others, and may be the same or different than one another. Although generally illustrated as having a rectangular profile, it is contemplated that the transverse beams 504 may include any suitable profile, such as square, circular, oval, amongst others. In one non-limiting embodiment, the transverse beams 504 are formed from a rectangular tube (e.g., box tubing or the like) having a hollow interior portion.

The pair of parallel beams 502 and the pair of transverse beams 504 cooperate to form a rectangular space frame to bridge the gap formed between adjacent solar modules 1002. In this manner, a first transverse beam 504 is interposed between the pair of parallel beams 502 such that the first end portion 504*b* of the first transverse beam 504 is coupled to a portion of a first parallel beam 502 adjacent the first end portion 502*b* thereof and the second end portion 504*c* of the first transverse beam 504 is coupled to a portion of a second parallel beam 502 adjacent the first end portion 502*b* thereof. The second transverse beam 504 is coupled to the pair of parallel beams 502 in a similar manner, although it is contemplated that the pair of parallel beams 502 and the pair of transverse beams 504 may be coupled to one another to form any suitable profile. In embodiments, the pair of parallel beams 502 and the pair of transverse beams 504 may be coupled to each other by welding, although any suitable method is contemplated, such as adhesives, fasteners, rivets, amongst others.

Continuing with FIGS. 10-11B, each of the pair of torque tube clamps 506 is substantially similar and therefore one only torque tube clamp 506 will be described in detail herein in the interest of brevity. The torque tube clamp includes a base 508 and a fastener 510 operably coupled to the base 508. The base 508 defines a generally inverted U-shaped profile having a base portion 508*a* and a pair of opposed side portions 508*b* disposed in spaced relation to one another thereon and extending therefrom. Each of the pair of opposed side portions 508*b* define a channel 508*c* therethrough configured to receive a portion of a torque tube (not shown) therein. In this manner, the channel 508*c* defines a generally U-shaped profile, although it is contemplated that the channel 508*c* may define any suitable profile, such as circular, oval, elliptical, amongst others, depending upon the profile of the torque tube (not shown) of the solar module 1004 and the design needs of the slew gear bridge 500. In embodiments, the base 508 may be formed from a pair of brackets 508*d* and 508*e* having a generally triangular profile (FIG. 11B.

In embodiments, the base 508 may be fixedly secured to the elongate body 504*a* of the transverse beam 504 by welding, adhesives, rivets, amongst others. In one non-limiting embodiment, the base 508 is selectively secured to the elongate body 504*a* of the transverse beam 504 by the fastener 510. The fastener 510 defines a generally U-shaped configuration that is configured to receive a portion of the torque tube (not shown) therein. In this manner, the torque tube is received within the channel 508*c* of the base 508 and the fastener 510 is disposed over the torque tube. A pair of legs 510*a* and 510*b* of the fastener 510 is received through respective bores of the transverse beam 504 such that a corresponding pair of nuts 510*c* may threadably engage a portion of each of the pair of legs 510*a*, 510*b*. As the pair of nuts 510*c* are threaded onto the respective pair of legs 510*a*, 510*b* the fastener 510 is caused to be drawn towards the base 508 and clamp or otherwise secure the torque tube (not shown) to the torque tube clamp 506 to inhibit movement of the slew gear bridge 500 relative to the torque tube. Although generally described as a U-bolt, it is contemplated that the fastener 510 may be any suitable fastener, plurality of fasteners, etc. capable of securing the torque tube (not shown) to the base 508.

Turning to FIGS. 12-15, a row-to-row bridge is illustrated and generally identified by reference numeral 600. The row-to-row bridge 600 includes a pair of parallel beam assemblies 610, a pair of transverse beams 630, and a pair of torque tube clamps 650.

Each of the pair of parallel beam assemblies 610 is substantially similar and therefore only one parallel beam assembly 610 will be described in detail in the interest of brevity. The parallel beam assembly 610 includes an outer tube 612, an inner tube 614, an insert 616, and a pair of coupling assemblies 620. The outer tube 612 includes an elongate body 612*a* extending between opposed first and second end portions 612*b* and 612*c*, respectively. The elongate body 612*a* defines a generally square tube profile having an interior channel 612*d* defined therethrough. The outer tube 612 includes an end cap 612*e* that is operably coupled to the first end portion 612*b* of the outer tube 612. It is envisioned that the end cap 612*e* may be coupled to the outer tube 612 using any suitable means, such as friction fit, welding, adhesives, fasteners, amongst others. In one non-limiting embodiment, the end cap 612*e* defines a tongue (not shown) that is configured to be received within a portion of the interior channel 612*d*. A side face 612*f* of the end cap 612*e* defined a cavity 612*g* therein that is configured to receive a portion of a coupling assembly of the pair of coupling assemblies 620, as will be described in further detail hereinbelow.

The inner tube 614 includes an elongate body 614*a* extending between opposed first and second end portions 614*b* and 614*c*, respectively. The elongate body 614*a* defines a generally circular tube profile having an interior channel 614*d* defined therethrough, although it is contemplated that the elongate body 614*a* may be a solid tubular bar. The inner tube 614 includes an end cap 614*e* that is operably coupled to the second end portion 614*c* thereof. The end cap 614*e* is substantially similar to the end cap 612*e*, and therefore the end cap 614*e* will not be described in detail herein in the interest of brevity.

Figures 13, 13A, 14, 15:
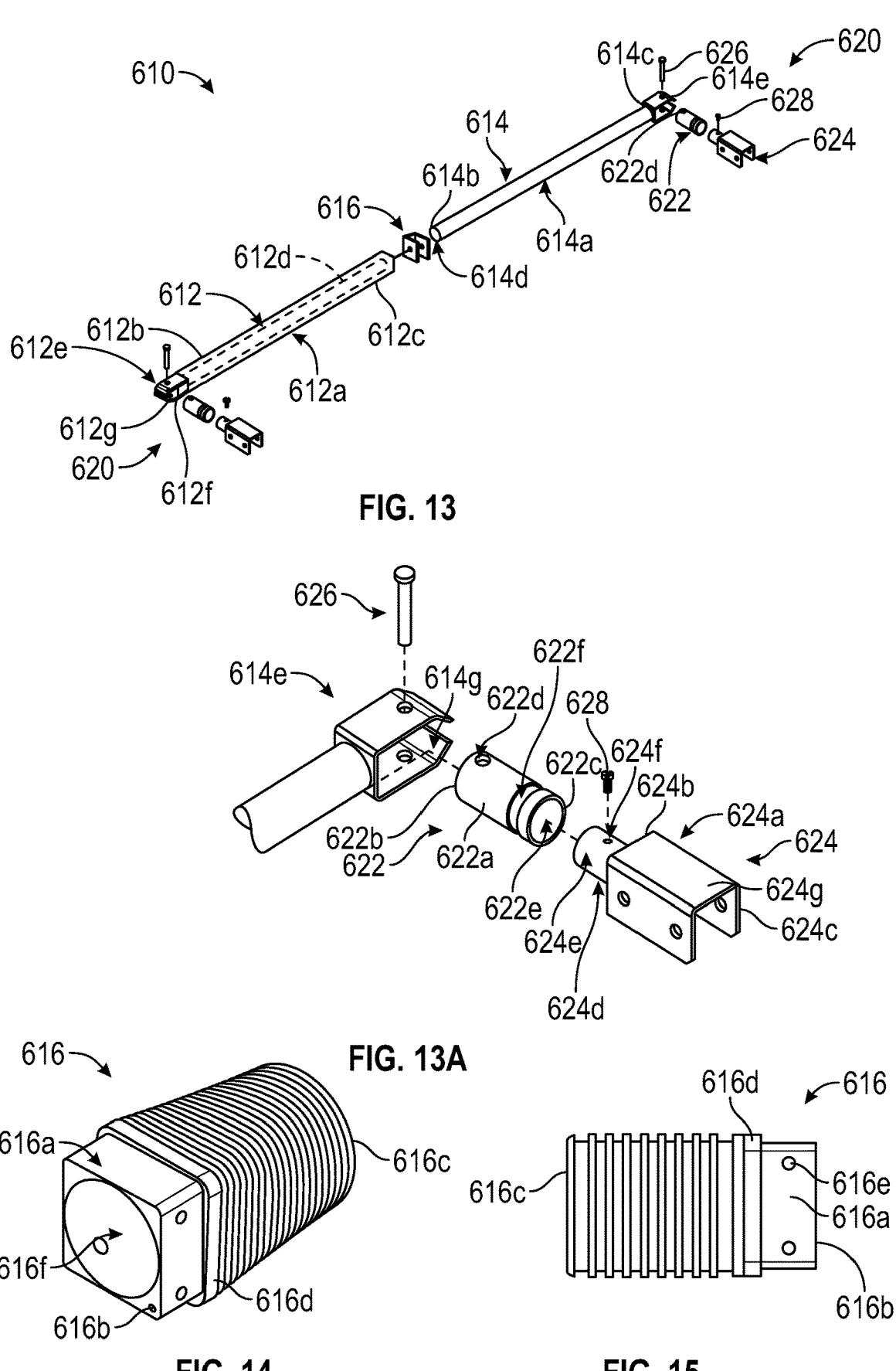
FIG. 13 is an exploded, perspective view of a parallel beam of the row-to-row bridge of FIG. 12.
FIG. 13A is a perspective view of a coupler of the row-to-row bridge of FIG. 12.
FIG. 14 is a perspective view of an insert of the row-to-row bridge of FIG. 12.
FIG. 15 is an elevation view of the insert of FIG. 14.

Continuing with FIGS. 14 and 15, the insert 616 defines an outer surface 616*a* extending between opposed first and second end surfaces 616*b* and 616*c*, respectively. The outer surface 616*a* defines a generally square profile and is configured to be received within the interior channel 612*d* of the outer tube 612. As can be appreciated, the outer surface 616*a* may define any suitable profile that is capable of being received within the interior channel 612*d* of the outer tube 612 and may be the same or different than the interior channel 612*d*. The outer surface 616*a* includes an annular ridge 616*d* disposed thereon. The annular ridge 616*d* is configured to abut a portion of the second end portion 612*c* of the outer tube 612 and inhibit the insert 616 from being further received within the interior channel 612*d*. In this manner, the location of the annular ridge 616*d* on the outer surface 616*a* of the insert 612 may be varied depending upon the design needs of the row-to-row bridge 600. In embodiments, the outer surface 616*a* of the insert 616 may include a plurality of ridges, fins, or crenellations disposed thereon along the transition from the square profile adjacent the annular ridge 616*d* to the circular profile adjacent the second end surface 616*c*.

Figures 15A, 15B, 15C, 15D:
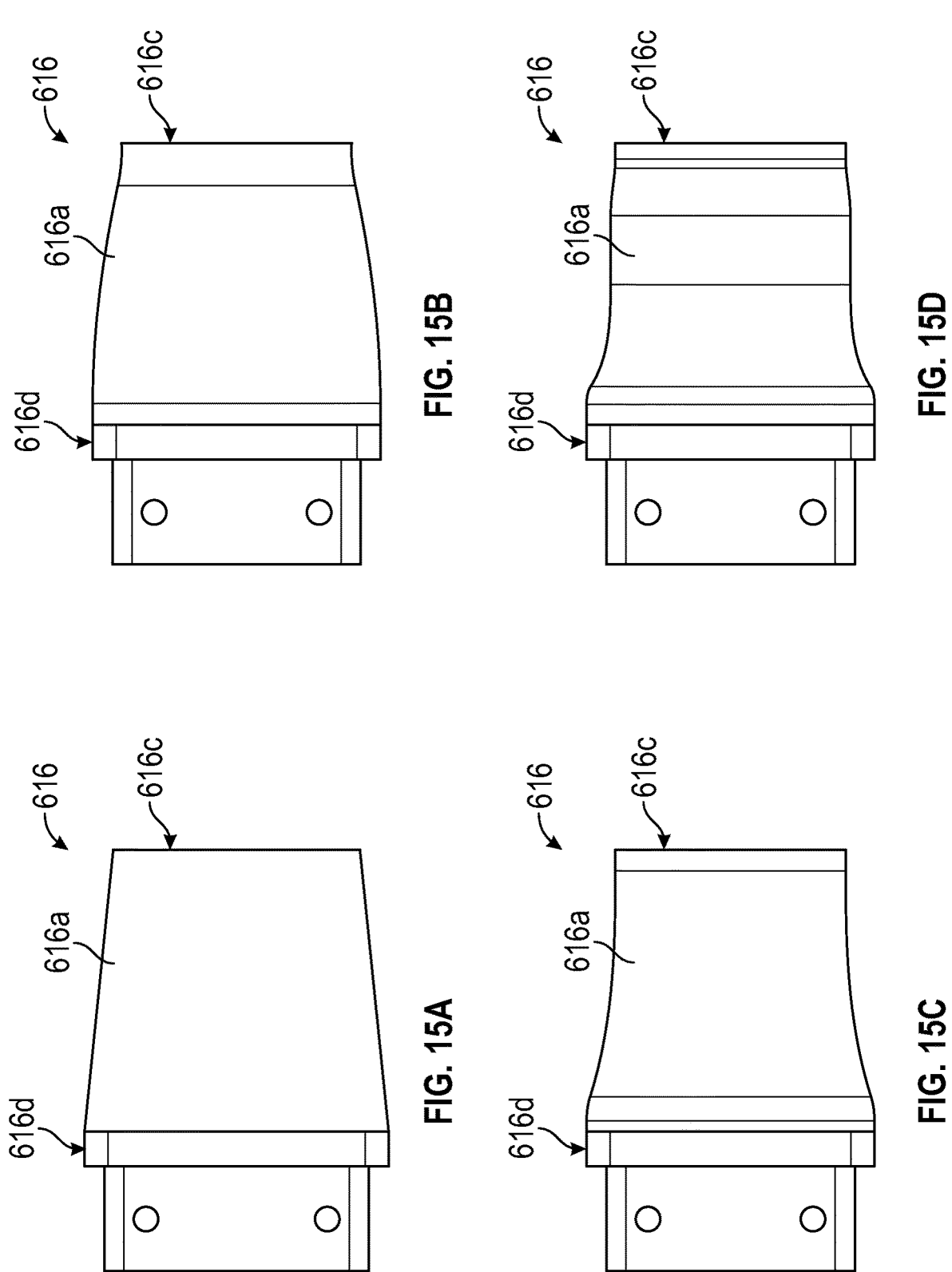
FIG. 15A is an elevation view of the insert of FIG. 14 having a conical profile.
FIG. 15B is an elevation view of the insert of FIG. 14 having a convex profile.
FIG. 15C is an elevation view of the insert of FIG. 14 having a concave profile.
FIG. 15D is an elevation view of the insert of FIG. 14 having a curvilinear profile.

The outer surface 616*a* of the insert 616 transitions from a square profile adjacent the annular ridge 616*d* to a circular profile adjacent the second end surface 616*c*. As can be appreciated, the transition from a circular profile adjacent the second end surface 616*c* to the square profile adjacent the annular ridge 616*d* aids in the transition of the cleaning equipment 2000 from the square sections of the outer tube 612 to the circular sections of the inner tube 614. It is envisioned that the profile of the outer surface 616*a* between the annular ridge 616*d* and the second end surface 616*c* may be linear (e.g., horizontal), may be a conical frustum linearly transitioning from a larger outer dimension to a smaller outer dimension (FIG. 15A), may define a convex profile (FIG. 15B), may define a concave profile (FIG. 15C), may define a curvilinear profile (FIG. 15D), combinations thereof, amongst others.

In embodiments, the outer surface 616a of the insert may include one or more through holes 616e defined therethrough that are configured to receive corresponding pins or fasteners 618 therein. In one non-limiting embodiments, the one or more through holes 616e are threaded to threadably engage the corresponding fasteners 618 and secure the insert 616 to the outer tube 612.

Continuing with FIGS. 14 and 15, the insert 616 defines a bore 616f extending through the first and second end surfaces 616b, 616c. The bore 616f is configured to slidably receive the inner tube 614 therein. In this manner, the bore 616f serves as a linear bushing or bearing to slidably support the inner tube 614 within the outer tube 612. As can be appreciated, the insert 616 reduces the amount of friction caused by the inner tube 614 sliding into and out of the outer tube 612 during operation and acts as a seal to inhibit dirt, dust, and other contaminants from entering the interior channel 612d of the outer tube 612. In embodiments, the insert 616 may include one or more a dust seals, gaskets, o-rings, shaft seals, or the like and combinations thereof to inhibit dust, fluid, or other contaminant intrusion into the interior channel 612d of the outer tube 612.

Returning to FIGS. 13 and 13A, each of the pair of parallel beams includes a corresponding pair of couplings 620. Each of the pair of couplings 620 is substantially similar and therefore only one coupling 620 will be described in detail herein in the interest of brevity. The coupling 620 includes a coupler 622 and a yoke 624 releasably connected thereto. The coupler 622 includes an elongate body defining an outer surface 622a extending between opposed first and second end portions 622b and 622c, respectively. Although generally illustrated as having a circular profile, it is contemplated that the coupler 622 may include any suitable profile, such as square, rectangular, oval, hexagonal, amongst others. The coupler 622 includes an outer dimension that is configured to be received within the cavity 612g of the end cap 612e. The outer surface 622a includes a first bore 622d defined therethrough adjacent the first end portion 622b that is configured to receive a portion of a pin 626 therein to couple the coupler 622 to the end cap 612e. Although generally illustrated as being a pin, it is contemplated that the pin 626 may be any suitable device capable of being received within the first bore 622d and coupling the coupler 622 to the end cap 612e, such as a cotter pin, rivet, fastener, amongst others.

Continuing with FIGS. 13 and 13A, the second portion 622c defines a counterbore 622e therein that is configured to slidably and rotatably receive a portion of the yoke 624 therein, as will be described in further detail hereinbelow. The outer surface 622a of the coupler 622 defines an annular slot 622f therethrough adjacent the second end portion 622c and into the counterbore 622e. The annular slot 622f includes a dimension that is configured to slidably receive a fastener 628 therein that is selectively coupled to the inner tube 614 using any suitable means, such as threadable engagement, welding, adhesives, press fit, amongst others. The annular slot 622f includes a length such that in cooperation with the yoke 624 and a fastener 628, the inner tube 614 is permitted to rotate within the outer tube 612 up to an angle of approximately 30 degrees. In this manner, the length of the annular slot 622f controls the amount of rotation of the inner tube 614 within the outer tube 612 before the fastener 628 abuts end portions thereof, and therefore the relative angles at which adjacent tracker modules 1002 may be placed (e.g., a first tracker module 1002 may be at a 10-degree angle whereas an adjacent, second tracker module 1002 may be at a 30-degree angle, etc.). As can be appreciated, limiting the amount of rotation of the inner tube 614 within the outer tube 612 inhibits the parallel beam assemblies 610 from contacting the ground when the solar modules 1002 are placed at a ±60 degree angle.

The yoke 624 includes an elongate body 624a extending between a first end surface 624b and an opposite second end portion 624c. The first end surface 624b includes a boss 624d disposed thereon and extending therefrom. The boss 624d defines an outer surface 624e and includes an outer dimension that is configured to be slidably and rotatably received within the counterbore 622e of the coupler 622. The outer surface 624e of the boss defines a threaded bore 624f therein that is generally aligned with the annular slot 622f of the coupler 622 when the boss 624d is received within the counterbore 622e of the coupler 622. In this manner, the fastener 628 may be received within the annular slot 622f of the coupler 622 and threadably engage the threaded bore 624f of the yoke 624 to couple the yoke 624 to the coupler 622 and inhibit axial movement of the yoke 624 relative to the coupler 622. As can be appreciated, the annular slot 622f and the fastener 628 cooperate to limit rotational movement of the yoke 624 relative to the coupler 622 to approximately 30 degrees. Although generally described as being a threaded bore 624f and a corresponding threaded fastener 628, it is envisioned that the bore 624f may not include threads and rather, may include a smooth interior surface, an annular groove to accommodate a detent on the fastener 628 (e.g., ball, circlip, etc.), amongst others.

The elongate body 624a of the yoke 624 includes an outer surface 624g extending between the first end surface 624b and the second end portion 624c. The elongate body 624a defines a generally inverted U-shaped profile defining a cavity 624h therein to accommodate a portion of a corresponding transverse beam 630 therein, as will be described in further detail hereinbelow. Although generally illustrated as having a pair of holes defined therethrough to accommodate a respective pair of fasteners therein to couple the yoke 624 to the transverse beam 630, it is contemplated that the yoke 624 may be coupled to the transverse beam 630 using any suitable means, such as welding, adhesives, rivets, fasteners, amongst others.

Returning to FIG. 12, the pair of transverse beams 630 is substantially similar and therefore only one transverse beam 630 will be described in detail herein in the interest of brevity. The transverse beam 630 includes an elongate body 630a defining a generally U-shaped center profile having a pair of wings 630b and 630c extending therefrom, respectively. In this manner, in a longitudinal direction, the first wing 630b includes a first end portion 630d and transitions to a first transverse leg 630e disposed generally perpendicularly to the first wing 630b. The first transverse leg 630e transitions to a center span 630f disposed parallel to the first wing 630b. The center span 630f transitions to a second transverse leg 630g that is disposed parallel to the first transverse leg 630e and extending in the same direction. The second transverse leg 630g transitions to the second wing 630c that is disposed substantially coaxial with the first wing 630b and terminates at a second end portion 630h. The first end portion 630d of the first wing 630b is received within the cavity 624h of the yoke 624 of a first parallel beam assembly 610 using any suitable means, such as fasteners, welding, adhesives, rivets, amongst others. Similarly, the second end portion 630h of the second wing 630c is received within the cavity 624h of the yoke 624 of a second parallel beam assembly 610 using any suitable means, such as fasteners, welding, adhesives, rivets, amongst others. As can be appreciated, the second transverse beam 630 is coupled to the pair of yokes 624 of respective parallel beam assemblies 610 in a substantially similar manner to the first transverse beam 630. In embodiments, the center span 630f of each of the transverse beams 630 is disposed towards an interior portion of the row-to-row bridge 600 to provide clearance for the mechanical and electrical components of each adjacent solar module 1002.

The row-to-row bridge 600 is coupled to each of the adjacent solar modules 1002 using the clamp or other suitable bracket 650. In this manner, the brackets 650 are coupled to a portion of each respective center span 630f of the pair of transverse beams 630 such that rotation of each adjacent solar module 1002 effectuates a corresponding rotation of the respective transverse beam of the pair of transverse beams 630. As can be appreciated, the relationship between the inner tube 614 and the outer tube 612 of the pair of longitudinal beam assemblies 610 permits each adjacent solar module 1002 to rotate at different angles relative to one another without deforming or otherwise introducing stress into the row-to-row bridge 600.

Figures 12A, 12B:
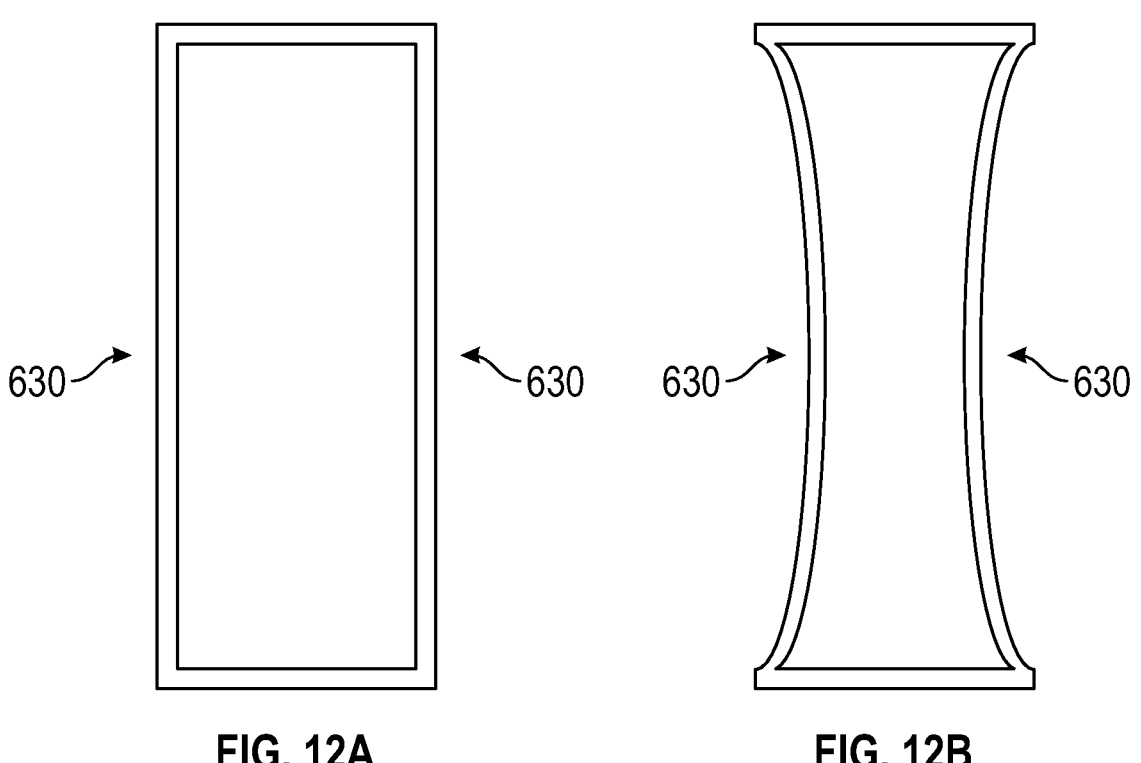
FIG. 12A is a plan view of the row-to-row bridge of FIG. 12 having a rectangular profile.
FIG. 12B is a plan view of the row-to-row bridge of FIG. 12 having a arcuate profile.
Figures 12C, 12D:
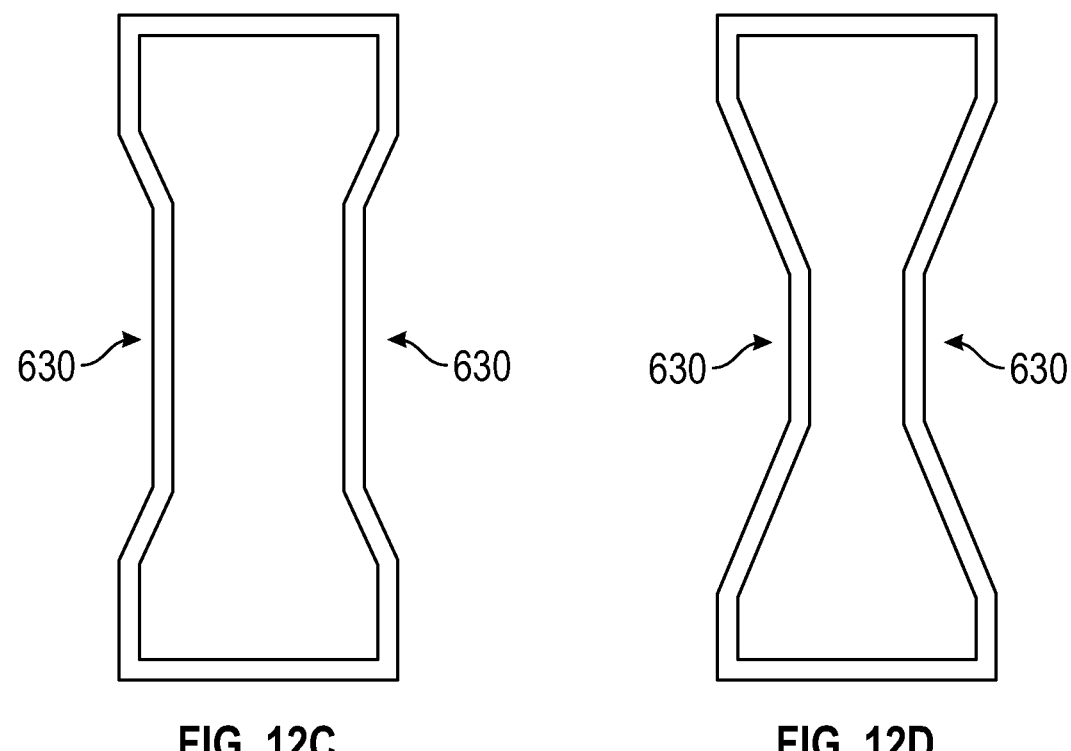
FIG. 12C is a plan view of the row-to-row bridge of FIG. 12 having a trapezoidal profile.
FIG. 12D is a plan view of the row-to-row bridge of FIG. 12 having another trapezoidal profile.

Although generally illustrated as having a generally U-shaped center profile, it is contemplated that each of the transverse beams 630 may include a linear profile (FIG. 12A), an arcuate profile (FIG. 12B), a trapezoidal profile having a long center portion (FIG. 12C), a trapezoidal profile having a short center portion (FIG. 12D), amongst others and any combination thereof.

With reference to FIGS. 16-19, a flexible length row-to-row bridge is illustrated and generally identified by reference numeral 700. The flexible length row-to-row bridge 700 includes a pair of parallel beam assemblies 710 and a pair of transverse beam assemblies 730.

Each of the pair of parallel beam assemblies 710 is substantially similar and therefore only one parallel beam assembly 710 will be described in detail herein in the interest of brevity. The parallel beam assembly 710 includes an outer tube 712, an inner tube 714, an insert 716, and a pair of coupling assemblies 720. The outer tube 712, the inner tube 714, and the insert 716 are substantially similar to the outer tube 612, the inner tube 614, and the insert 616, and therefore only the differences therebetween will be described in detail herein in the interest of brevity.

The first end portion 712a of the outer tube 712 includes a pair of tabs 712h and 712i, respectively, extending longitudinally therefrom and disposed in spaced relation to one another such that a channel 712j is formed therebetween. The second end portion 714b of the inner tube 714 includes a yoke 614e disposed thereon and extending longitudinally therefrom. The yoke 714e defines a pair of tabs 714f and 714g, respectively, extending longitudinally therefrom and disposed in spaced relation to one another such that a channel 714h is formed therebetween. As will be appreciated, the pair of tabs 712h, 712i and 714f, 714g cooperate with a respective portion of a respective coupling assembly of the pair of coupling assemblies 720, as will be described in further detail hereinbelow.

Figures 16, 17, 17A, 17B:
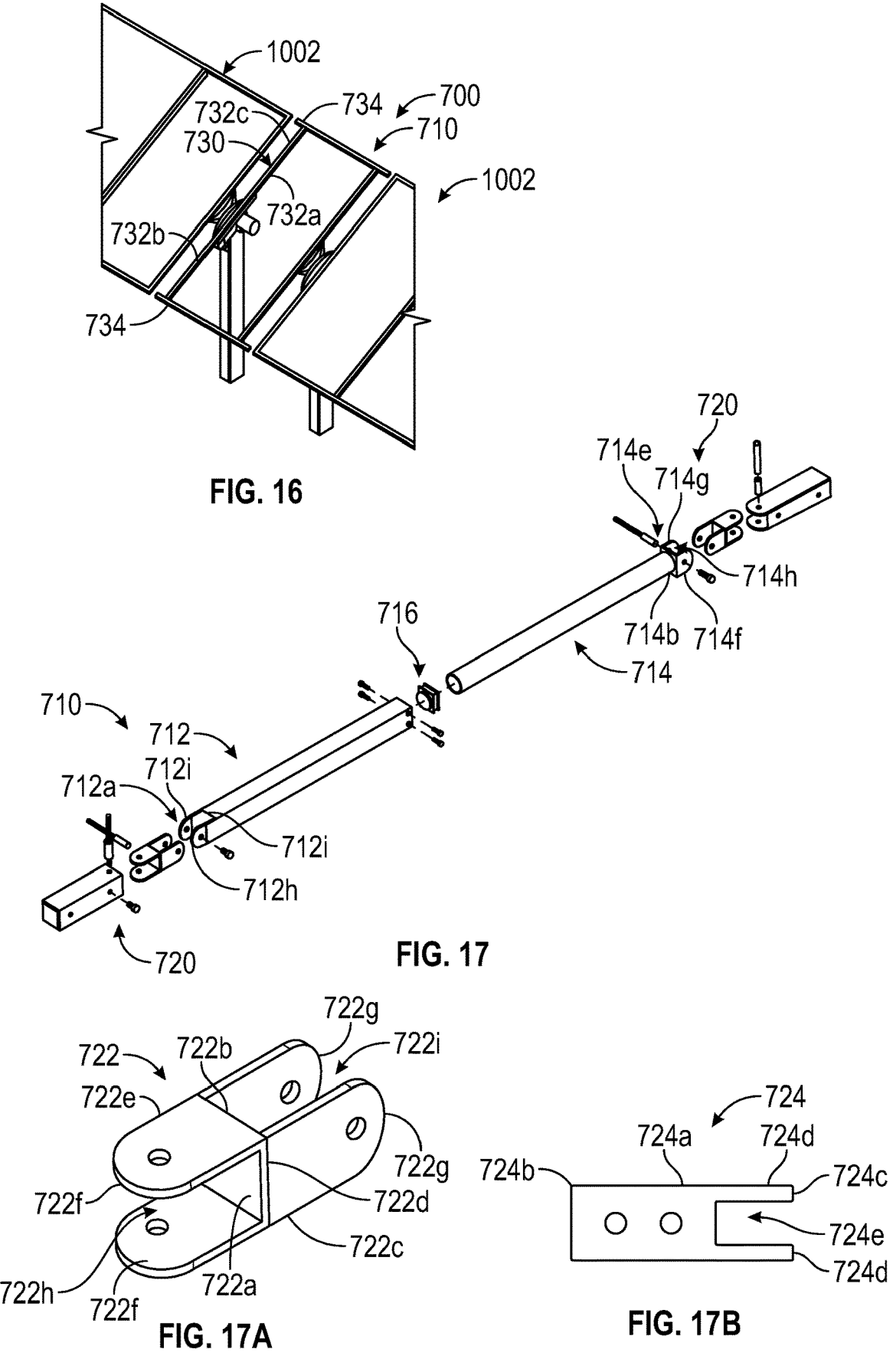
FIG. 16 is a perspective view of a flexible length row-to-row bridge in accordance with the present disclosure.
FIG. 17 is an exploded, perspective view of a parallel beam of the flexible length row-to-row bridge of FIG. 16.
FIG. 17A is a perspective view of a universal joint of the flexible length row-to-row bridge of FIG. 16.
FIG. 17B is an elevation view of a coupler of the flexible length row-to-row bridge of FIG. 16.

With reference to FIGS. 17, 17A, and 17B, each of the pair of coupling assemblies 720 is substantially similar and therefore only one coupling assembly 720 will be described herein in the interest of brevity. The coupling assembly 720 includes a universal joint 722 and a coupler 724 operably coupled thereto. The universal joint 722 includes a vertical wall 722a extending between upper and lower portions 722b and 722c, respectively, and opposed first and second side portions 722d and 722e, respectively. A first pair of tabs 722f is disposed in spaced relation to one another on the vertical wall 722a adjacent each respective upper and lower portion 722b, 722c and extending therefrom. A second pair of tabs 722g is disposed in spaced relation to one another on the vertical wall 722a adjacent each respective first and second side portions 722d, 722e and extending therefrom in an opposite direction to that of the first pair of tabs 722f. In this manner, a transverse channel 722h is formed between the first pair of tabs 722f and a vertical channel 722i is formed between the second pair of tabs 722f The universal joint 722 includes an outer width that is configured to be slidably received within the channel 712j of the outer tube 712 such that the pair of tabs 712h and 712i are rotatably coupled to the second pair of tabs 722f using any suitable means, such as fasteners, rivets, cotter pins, amongst others. Although generally described as having the first pair of tabs 722f being received within the channel 712j of the outer tube 712, it is contemplated that the pair of tabs 712h and 712i of the outer tube 712 may be slidably received within the vertical channel 722i of the universal joint 722. As can be appreciated, the second pair of tabs 722f of the universal joint 722 cooperate with the pair of tabs 712h, 712i of the outer tube to permit vertical rotation of the universal joint 722 relative to the outer tube 712.

Continuing with FIG. 17B, the coupler 724 includes an elongate body 724a extending between opposed first and second end portions 724b and 724c, respectively. A pair of tabs 724d is disposed in spaced relation to one another adjacent the second end portion 724c of the coupler 724 and extends therefrom. In this manner, the pair of tabs 724d define a transverse channel 724e therebetween that is configured to slidably receive the first pair of tabs 722f of the universal joint 722. The first pair of tabs 722f and the pair of tabs 724d of the coupler 724 are rotatably coupled to one another using any suitable means, such as fasteners, rivets, cotter pins, amongst others. In one non limiting embodiment, the first pair of tabs 722f and the pair of tabs 724d of the coupler 724 are rotatably coupled to one another using a pin. Although generally described as having the first pair of tabs 722f of the universal joint being slidably received within the transverse channel 724e of the coupler 724, it is contemplated that the transverse channel 722h of the universal joint 722 may slidably receive the pair of tabs 724f of the coupler 724. The elongate body 724a of the coupler 724 includes an outer dimension that is configured to be slidably received within a portion of an end cap 734 of the transverse beam assembly such that the coupler 724 is coupled to the end cap 734, as will be described in further detail herein below.

Figures 18, 19, 19A, 19B, 20:
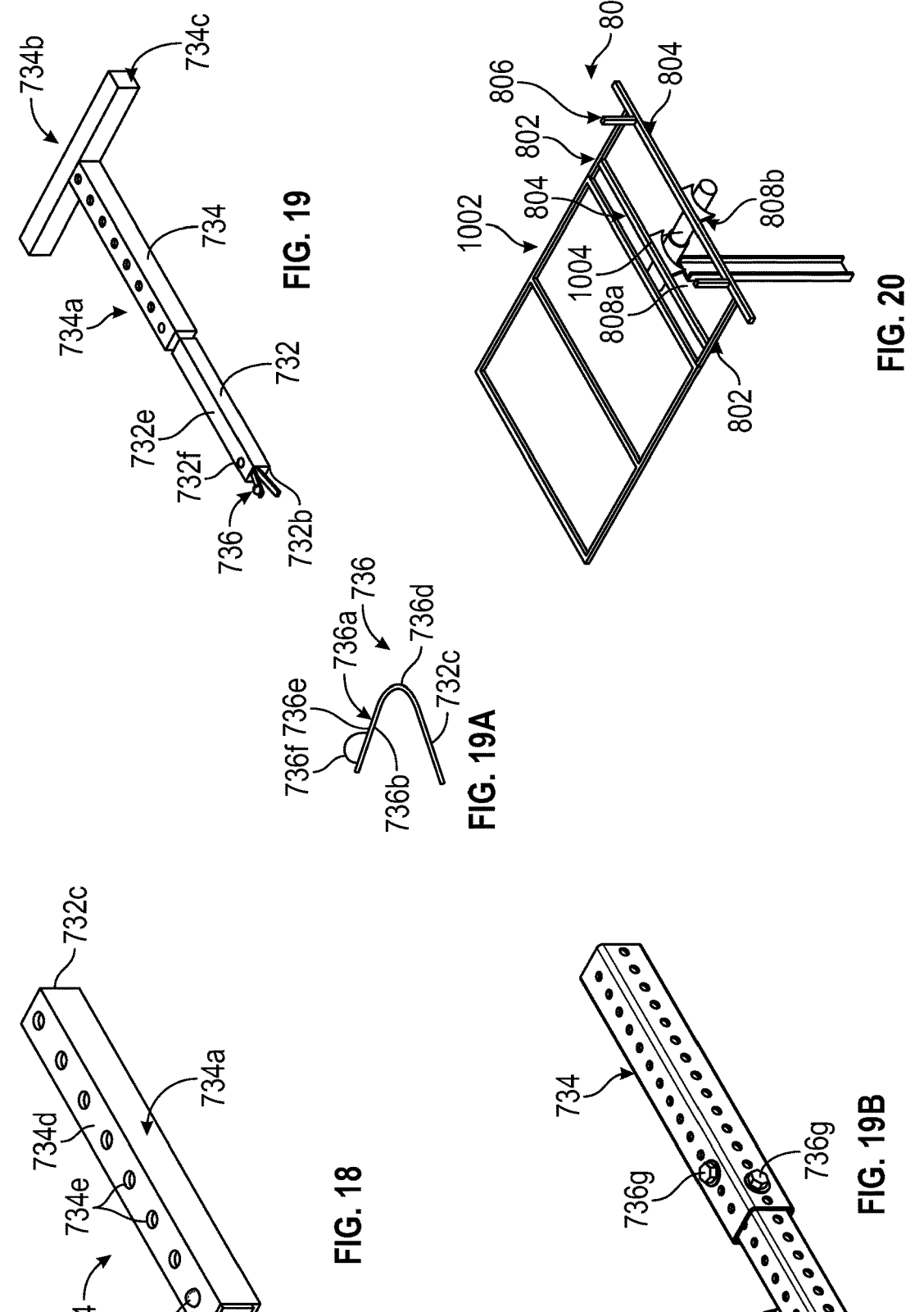
FIG. 18 is a perspective view of a telescoping mechanism of the flexible length row-to-row bridge of FIG. 16 shown in a retracted position.
FIG. 19 is a perspective view of the telescoping mechanism of FIG. 18 shown in an extended position.
FIG. 19A is an elevation view of a detent mechanism of the flexible length row-to-row bridge of FIG. 16.
FIG. 19B is a perspective view of the telescoping mechanism of FIG. 18 shown utilizing fasteners to maintain a desired length thereof.
FIG. 20 is a perspective view of a fixed length return station in accordance with the present disclosure.

With reference to FIGS. 16, 18, and 19, each of the transverse beam assemblies 730 is substantially similar and therefore only one transverse beam assembly 730 will be described in detail herein in the interest of brevity. The transverse beam assembly 730 includes a center beam 732, a pair of detent mechanisms 736, and a pair of end caps 734.

The center beam 732 includes an elongate body 732a extending between opposed first and second end portions 732b and 732c, respectively. Although generally illustrated as being a linear box beam (e.g., a hollow, square profile), it is contemplated that the elongate body 732a may include any suitable profile, such as rectangular, circular, oval, amongst others, and may be hollow or solid, depending upon the design needs of the row-to-row bridge 700. In one non-limiting embodiment, the elongate body 732a includes a cavity 732d defined through each of the first and second end portions 732b, 732c and extending therethrough. An upper surface 732e of the elongate body 732a includes a pair of bores 732f defined therethrough adjacent each respective first and second end portions 732b, 732c that is configured to selectively engage a portion of a respective detent mechanism 736, as will be described in further detail hereinbelow.

With continued reference to FIGS. 18 and 19, and with additional reference to FIG. 19A, each of the pair of detent mechanisms 736 is substantially similar and therefore only one detent mechanism 736 will be described in detail herein in the interest of brevity. The detent mechanism 736 includes a resilient member 736a having a generally V-shaped profile defining first and second legs 736b and 736c, respectively, joint at a crown 736d. Each of the first and second legs 736b, 736c extends from the crown 736d in a splayed manner (e.g., outward or away from one another in a non-parallel fashion). The resilient member 736a is formed from a resilient material capable of being deformed as a force is applied to one or both of the first and second legs 736b, 736c (e.g., compressed towards one another) and returning to its original shape (e.g., elastically deformed). An upper surface 736e of the first leg 736b includes a button or ball 736f disposed thereon using any suitable means, such as welding, adhesives, fasteners, amongst others. The button 736f is configured to selectively engage a bore of the pair of bores 732f of the center beam 732 to selectively couple the detent mechanism 736 to the center beam 732, as will be described in further detail hereinbelow. It is envisioned that the detent mechanism may be any suitable button pin, snap button, tubing button, etc. that is capable of selectively retaining the center beam 732 to the pair of end caps 734.

In operation, as the detent mechanism 736 is advanced within the cavity 732d adjacent a respective first or second end portion 732b, 732c of the center beam 732, the button 736f and a portion of the second leg 736c abuts or otherwise contacts a portion of the center beam 732. As the detent mechanism 736 is caused to be further advanced within the cavity 732d, the first and second legs 736b, 736c of the detent mechanism 736 are caused to be compressed towards one another. Further advancement of the detent mechanism 736 within the cavity 732d causes the button 736f to be received within the bore 732f of the center beam 732 and protrude past the upper surface 732e. As can be appreciated, the button 736f of the detent mechanism and the bore 732f of the center beam cooperate to selectively couple the detent mechanism 736 to the center beam 732. In this manner, compression of the button 736f towards the second leg 736c of the detent mechanism 736 causes the button 736f to be depressed below the upper surface 732e of the center beam 732 into the cavity 732d, thereby releasing the button 736f from the bore 732f and permitting the detent mechanism 736 to slide relative to the center beam 732 and be removed therefrom. Although generally described as having a detent mechanism 736, it is envisioned that the length of the transverse beam assembly 730 may be selectively fixed using fasteners 736g (FIG. 19B).

Continuing with FIGS. 18 and 19, each of the pair of end caps 734 is substantially similar and therefore only one end cap 734 will be described in detail herein in the interest of brevity. The end cap 734 includes a generally T-shaped profile having a stem 734a and a cross-beam 734b coupled to the stem 734a at a generally perpendicular angle thereto. It is contemplated that the stem 734a and the cross-beam 734b may be coupled to one another using any suitable means, such as welding, adhesives, fasteners, amongst others. Each of the stem 734a and the cross-beam 734b define a generally square profile having a hollow interior portion 734c defined therein. As can be appreciated, the hollow interior portion 734c includes a profile that is similar to the profiles of the center beam 732 and the coupler 724. In this manner, the hollow interior portion 734c includes an inner dimension that is configured to slidably receive a portion of each of the center beam 732 and the coupler 724. It is envisioned that the stem 734a and the cross-beam 734b many include any suitable outer profile, such as square, rectangular, circular, oval, amongst others and may include the same or different outer profile, as long as the profile of the hollow interior portion 734c is capable of slidably receiving a portion of each of the center beam 732 and the coupler 724 therein.

An upper surface 734d of the stem 734a includes a plurality of holes 734e defined therethrough that is configured to releasably engage the button 736f of the detent mechanism 736. In this manner, as the center beam 732 is slidably advanced within the hollow interior portion 734c of the stem 734a, the button 736e is caused to compress or otherwise urged towards the second leg 736c to permit further advancement of the center beam 732 therein. Further advancement of the center beam 732 within the hollow interior portion 734c of the stem 734a causes the button 736f to be received in a first hole of the plurality of holes 734e and be releasably retained therein and selectively couple the center beam 732 to the end cap 734. With the button 736f received within the first hole of the plurality of holes 734e, the center beam 732 is inhibited from translating relative to the end cap 734, thereby maintaining an overall length of the transverse beam assembly 730. The button 736f of the detent mechanism 736 and the plurality of holes 734e cooperate to permit adjustment of the length of the transverse beam assembly 730. In this manner, the button 736f may be depressed to release the button 736f from a hole of the plurality of holes 734e of the stem and the end cap 734 may be translated relative to the center beam 736 to increase or decrease the length of the transverse beam assembly 714 until the button 736f is received within another hole of the plurality of holes 734d. As can be appreciated, this process may be repeated as many times as necessary to achieve the desired length of the transverse beam assembly 730. In this manner, the flexible length row-to-row bridge 700 may be utilized with solar modules 1002 of various sizes by adjusting the length of the transverse beam assembly 730 to substantially match the size of the adjacent solar module 1002.

Figure 21:
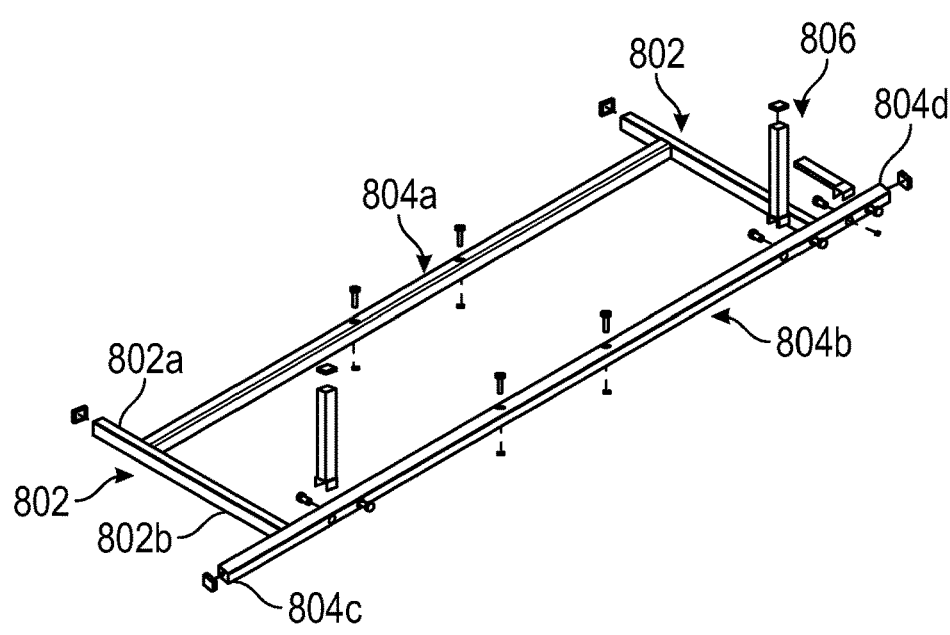
FIG. 21 is an exploded, perspective view of the fixed length return station of FIG. 20.

Turning now to FIGS. 20 and 21, a fixed length return station is illustrated and generally identified by reference numeral 800. The fixed length return station 800 includes a pair of parallel beams 802, a pair of transverse beams 804, a vertical beam 806, and a pair of mounting brackets 808. The pair of parallel beams 802 are substantially similar to one another and define an elongate body extending between opposed first and second end portions 802a and 802b, respectively. Although generally illustrated as having a square profile, it is contemplated that the pair of parallel beams 802 may include any suitable profile, such as circular, oval, octagonal, amongst others, any may be solid or have a hollow interior portion.

The pair of transverse beams 804 includes a first transverse beam 804a and a second transverse beam 804b. Each of the first and second transverse beams 804a, 804b include a generally square profile, although it is contemplated that the first and second transverse beams 804a, 804b may include any suitable profile, such as circular, oval, octagonal, amongst others, may be the same or different to one another, and may be solid or have a hollow interior portion. The first transverse beam 804a is interposed between the pair of parallel beams 802 such that the pair of parallel beams 802 is disposed in spaced relation to one another and at a generally perpendicular angle to the first transverse beam 804a. It is contemplated that the first transverse beam 804a may be coupled to each of the pair of parallel beams 802 by any suitable mans, such as welding, adhesives, fasteners, amongst others. The second transverse beam 804b includes an elongate body extending between opposed first and second end portions 804c and 804d, respectively. The second transverse beam 804b includes an overall length such that each of the first and second end portions 804c and 804d extend past the pair of parallel beams 802. In this manner, the second end portion 802b of each of the pair of parallel beams 802 intersects a portion of the elongate body of the second transverse beam 804b and is coupled thereto using any suitable means, such as welding, adhesives, fasteners, amongst others.

The vertical beam 806 is disposed on an upper portion of the elongate body of the second transverse beam 804b and extends therefrom. Although generally illustrated as having a square profile, it is contemplated that the vertical beam 806 may include any suitable profile, such as circular, oval, octagonal, amongst others, and may include the same or different profile to that of the pair of parallel beams 802 and the pair of transverse beams 804. It is envisioned that the vertical beam 806 may be coupled to the second transverse beam 804b using any suitable means, such as welding, adhesives, fasteners, amongst others. The vertical beam 806 is disposed on the second transverse beam 804b at a location that is in between each of the pair of parallel beams 802 such that the vertical beam 806 is permitted to inhibit movement of the cleaning equipment 2000 therepast (e.g., act as a positive stop for the cleaning equipment 2000).

The pair of brackets 808 includes as first bracket 808a coupled to a portion of the first transverse beam 804a and a second bracket 808b coupled to a portion of the second transverse beam 804b. The pair of brackets 808 is configured to couple the fixed length return station 800 to a torque tube extension 1004 that is operably coupled to a torque tube of the adjacent solar module 1002. It is envisioned that the pair of brackets 808 may be any of the brackets described herein capable of coupling the fixed length return station 800 to the torque tube extension 1004 and inhibiting translation and rotation of the fixed length return station 800 relative thereto. As can be appreciated, the fixed length return station 800 enables the cleaning equipment 2000 to fully clean the adjacent solar module 1002 and enable the cleaning equipment 2000 to sense that it has reached an end of the solar module 1002 and must travel in the opposite direction to reach its docking station.

Figure 22:
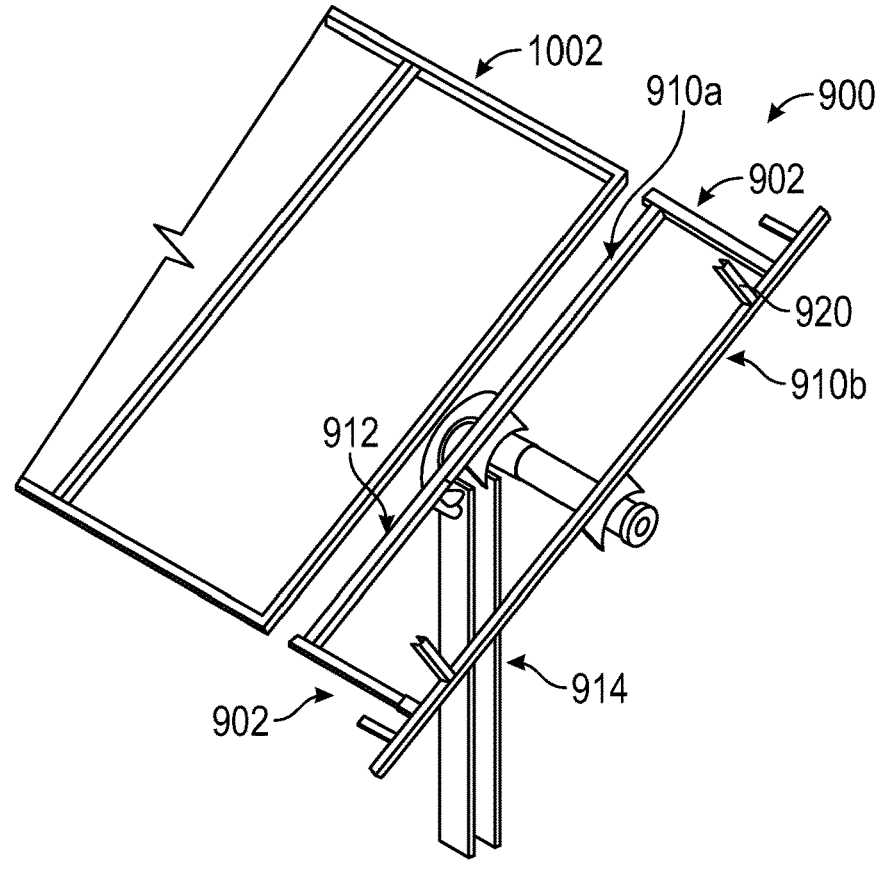
FIG. 22 is a perspective view of a flexible length return station in accordance with the present disclosure.
Figures 23, 23A, 23B:
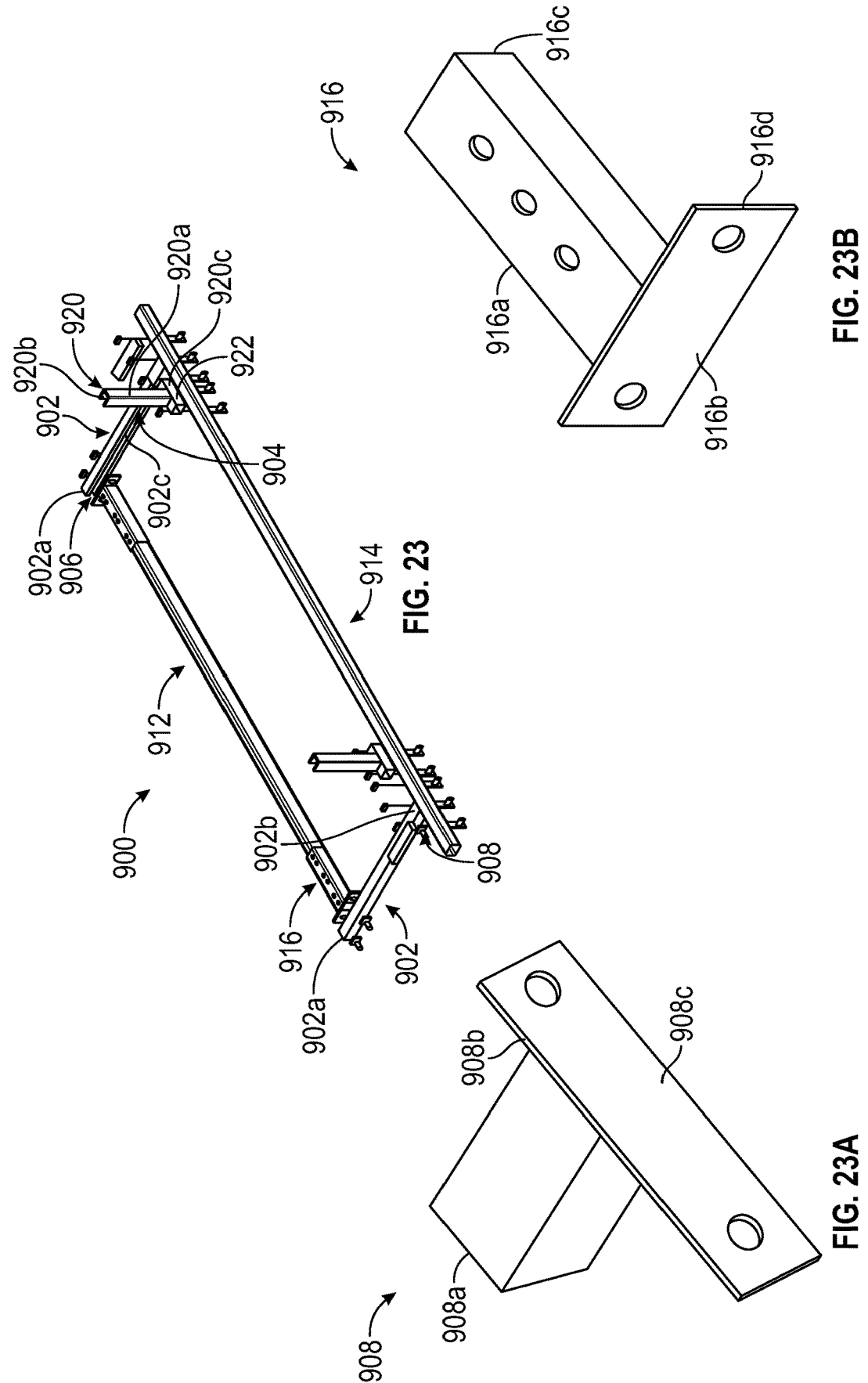
FIG. 23 is an exploded, perspective view of the flexible length return station of FIG. 22.
FIG. 23A is a perspective view of an end bracket of the flexible length return station of FIG. 22.
FIG. 23B is a perspective view of another end bracket of the flexible length return station of FIG. 22.

With reference to FIGS. 22-23B, a flexible length return station is illustrated and generally identified by reference numeral 900. The flexible length return station 900 includes a pair of parallel beams 902, a pair of transverse beams 910, and a pair of vertical beams 920.

Each of the pair of parallel beams 902 is substantially similar and therefore one parallel beam 902 will be described in detail herein in the interest of brevity. The parallel beam 902 includes an elongate body extending between opposed first and second end portions 902a and 902b, respectively. A side surface 902c of the elongate body includes a channel 904 defined therethrough and extending within a hollow cavity 906 defined therewithin. The channel 904 includes a width that is less than a width of the side surface 902c of the elongate body end extends longitudinally through each of the first and second end portions 902a, 902b. In embodiments, the parallel beam 902 may be formed from Unistrut® or any other suitable structural framing material having similar construction. Although generally illustrated as having a square profile, it is contemplated that the parallel beam 902 may include any suitable profile, such as rectangular, oval, circular, amongst others.

The parallel beam 902 includes an end bracket 908 (FIG. 23A) releasably coupled thereto adjacent the second end portion 902b. The end bracket 908 includes an elongate body extending between opposed first and second end portions 908a and 908b, respectively. In embodiments, the elongate body of the end bracket 908 may define the same or similar profile as the parallel beam 902. The elongate body includes a cavity (not shown) defined through the first end portion 908a and extending through the second end portion 908b. The cavity is configured to receive the second end portion 902b of the parallel beam 902 therein such that the end bracket 908 is coupled thereto using any suitable means, such as welding, adhesives, fasteners, amongst others.

It is envisioned that the end bracket 908 may include a channel defined through a side surface thereof, and in embodiments, no channel may be defined therethrough. The second end portion 908b of the end bracket 908 includes a plate 908c coupled thereto and having a generally planar profile, although it is contemplated that any suitable profile may be utilized. The plate 908c is coupled to the second end portion 908b at a generally perpendicular angle and includes a width that is greater than that of the elongate body of the end bracket 908. It is envisioned that the plate 908c may be coupled to the end bracket 908 using any suitable means, such as welding, adhesives, fasteners, amongst others. It is envisioned that the end bracket 908 may be coupled to the parallel beam 902 using any suitable means, such as welding, adhesives, fasteners, amongst others. In one non-limiting embodiment, the end bracket 908 is coupled to the parallel beam 902 using channel nuts compatible with Unistrut® framing.

With continued reference to FIGS. 22-23B, the pair of transverse beams 910 includes a first transverse beam 912 and a second transverse beam 914. Although generally illustrated as having a shorter length than the second transverse beam 914, it is contemplated that the first transverse beam 912 may include a length that is the same or greater than the second transverse beam 914. The first and second transverse beams 912, 914 includes a similar profile to one another and to that of the parallel beam 902, although it is contemplated that the first and second transverse beams 912, 914 may include any suitable profile and may have the same or different profile than one another or the parallel beam 902. In one non-limiting embodiment, the first and second transverse beams 912, 914 may be formed from Unistrut® or any other suitable structural framing material having similar construction. The second transverse beam 914 is releasably coupled to an end bracket 908 of a respective parallel beam 902 using any suitable means, such as fasteners, adhesives, welding, amongst others, and in one non-limiting embodiment, is coupled to the end bracket 908 using channel nuts compatible with Unistrut® framing.

The first transverse beam 912 includes a pair of end brackets 916 releasably coupled thereto using any suitable means, such as welding, adhesives, fasteners, amongst others. In one non-limiting embodiment, the pair of end brackets 916 is releasably coupled to the first transverse beam using channel nuts compatible with Unistrut® framing. Each of the pair of end brackets 916 is substantially similar and therefore only one end bracket 916 will be described in detail herein in the interest of brevity.

The end bracket 916 includes an elongate body 916a extending between opposed first and second end portions 916b and 916c, respectively. It is envisioned that the end bracket 916 may include a channel defined through a side surface thereof, and in embodiments, no channel may be defined therethrough. The first end portion 916*b* of the end bracket 916 includes a plate 916*d* coupled thereto and having a generally planar profile, although it is contemplated that any suitable profile may be utilized. The plate 916*d* is coupled to the first end portion 916*b* at a generally perpendicular angle and includes a width that is greater than that of the elongate body of the end bracket 916. It is envisioned that the plate 916*d* may be coupled to the end bracket 916 using any suitable means, such as welding, adhesives, fasteners, amongst others. It is envisioned that the end bracket 916 may be coupled to the first transverse beam 912 using any suitable means, such as welding, adhesives, fasteners, amongst others. In one non-limiting embodiment, the end bracket 916 is coupled to the first transverse beam 912 using channel nuts compatible with Unistrut® framing. The plate 916*d* is configured to be releasably coupled to a respective parallel beam of the pair of parallel beams adjacent the first end portion 902*a* thereof. In embodiments, the end bracket 916 is coupled to the first transverse beam 912 using channel nuts compatible with Unistrut® framing. In this manner, the end bracket 916 releasably couples the first transverse beam 912 to the respective parallel beam 902 at a substantially perpendicular angle, although it is contemplated that the first transverse beam and the parallel beam 902 may be joined at any suitable angle.

As can be appreciated, by permitting the first transverse beam 912 to be slidably received within a portion of the end bracket 916 before selectively securing the end bracket 916 thereto, the overall length of the first transverse beam 912, and thereby the overall length of the flexible length return station 900 may be varied to accommodate differing sizes of solar modules 1002. In one non-limiting embodiment, the overall length of the flexible length return station 900 may be varied between 2000 mm and 2400 mm.

Continuing with FIGS. 22-23B, each of the pair of vertical beams 920 is substantially similar and therefore only one vertical beam 920 will be described in detail herein in the interest of brevity. The vertical beam 920 includes an elongate body 920*a* extending between opposed first and second end portions 920*b* and 920*c*, respectively. It is envisioned that in embodiments, a channel may be defined through a side surface of the elongate body 920*a*. In embodiments, the parallel beam vertical beam 920 may be formed from Unistrut® or any other suitable structural framing material having similar construction. Although generally illustrated as having a square profile, it is contemplated that the vertical beam 920 may include any suitable profile, such as rectangular, oval, circular, amongst others. The vertical beam 920 includes a bracket 922 disposed thereon adjacent the second end portion 920*b*. It is contemplated that the bracket 922 may be coupled to the vertical beam 920 using any suitable means, such as welding, adhesives, fasteners, amongst others. The bracket 922 is coupled to the vertical beam 920 such that the bracket 922 forms a generally perpendicular angle thereto.

The bracket 922 defines a generally inverted U-shaped profile that is configured to receive a portion of the second transverse beam 914 therein. In embodiments, the bracket 922 may include a planar profile, C-shaped profile, amongst others. The bracket 922 is coupled to the second transverse beam 914 using any suitable means, such as welding, adhesives, fasteners, amongst others. In one non-limiting embodiment, the bracket 922 is coupled to the second transverse beam 914 using channel nuts compatible with Unistrut® framing. In this manner, the location at which the vertical beam 920 is located on the length of the transverse beam 914 may be varied before tightening or otherwise fastening the vertical beam 920 thereto.

As can be appreciated, the pair of vertical beams 920 act as a stop or other mechanical feature to inhibit the cleaning equipment 2000 from traversing past the end of the flexible length return station 900. Although generally described as being a pair of vertical beams 920, it is contemplated that only one vertical beam 920 may be utilized or more than two vertical beams 920 may be utilized depending upon the design needs of the flexible length return station 900.

Figures 24, 24A, 25:
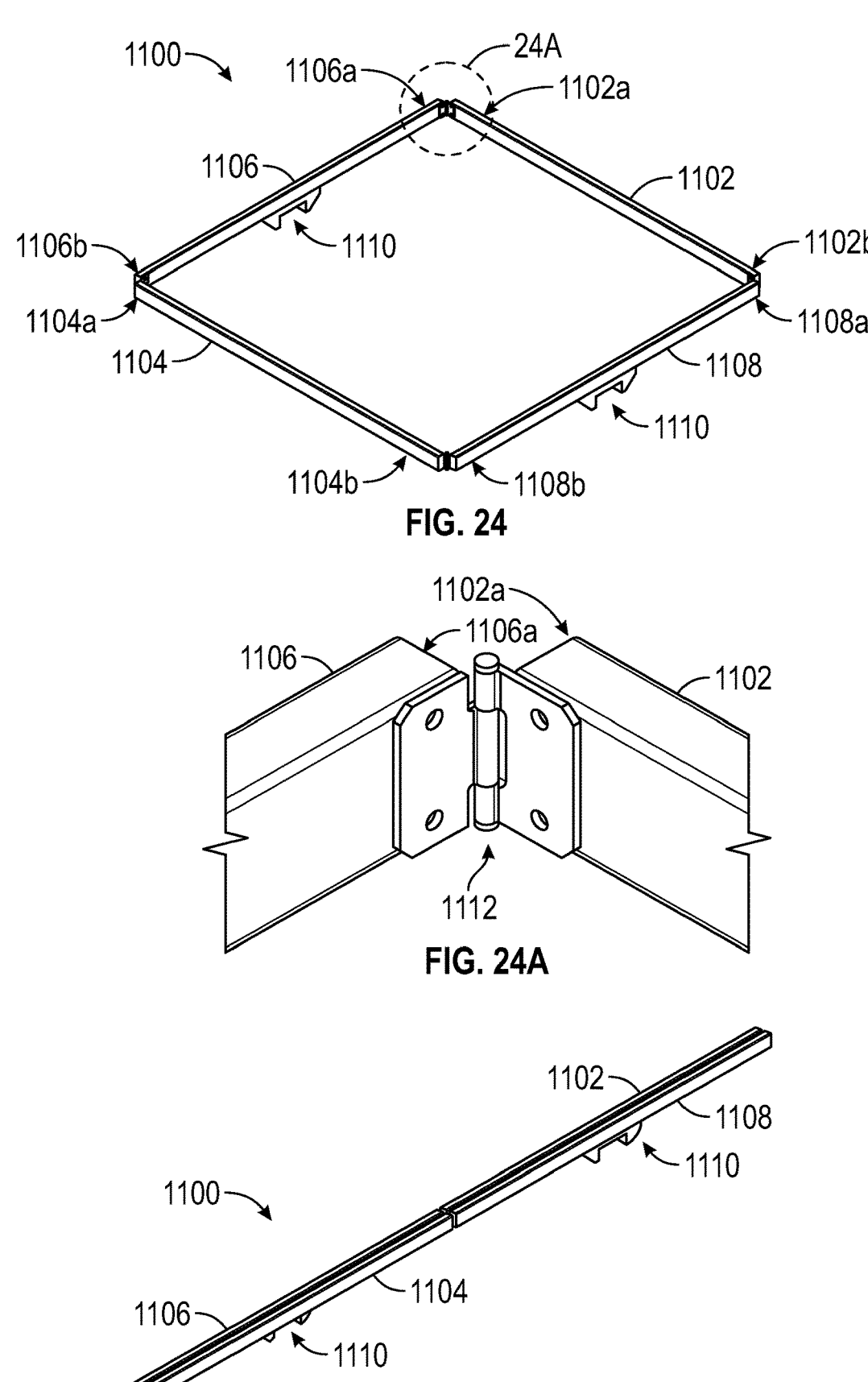
FIG. 24 is a perspective view of a collapsible bridge in an expanded position.
FIG. 24A is an enlarged view of the area of detail indicated in FIG. 24.
FIG. 25 is a perspective view of the collapsible bridge of FIG. 24 shown in a collapsed position.
Figure 26:
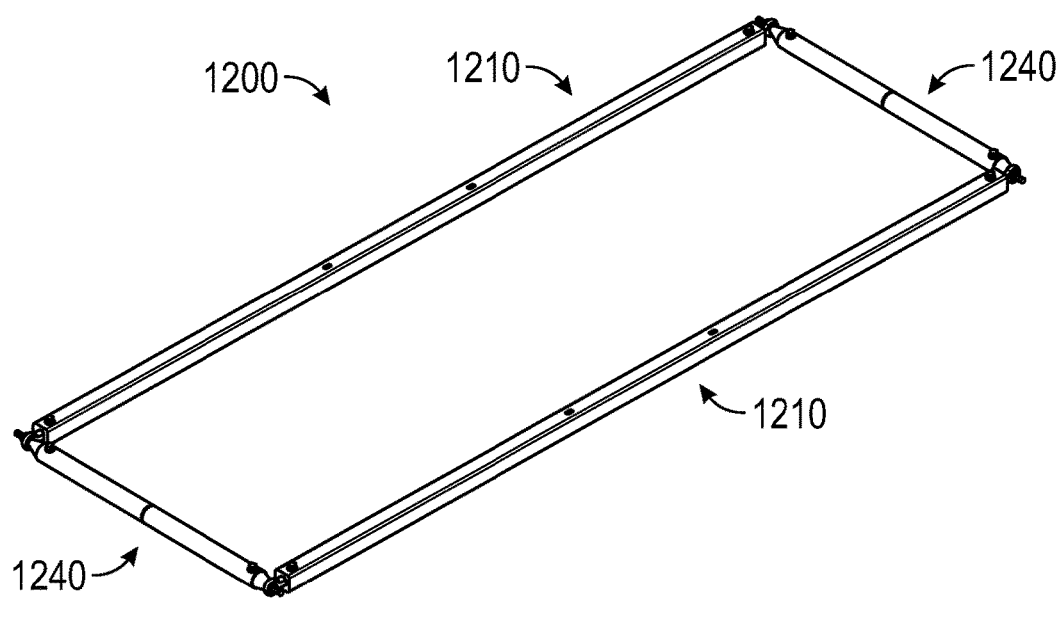
FIG. 26 is a perspective view of another embodiment of a flexible length row-to-row bridge provided in accordance with the present disclosure shown in a collapsed condition.
Figure 27:
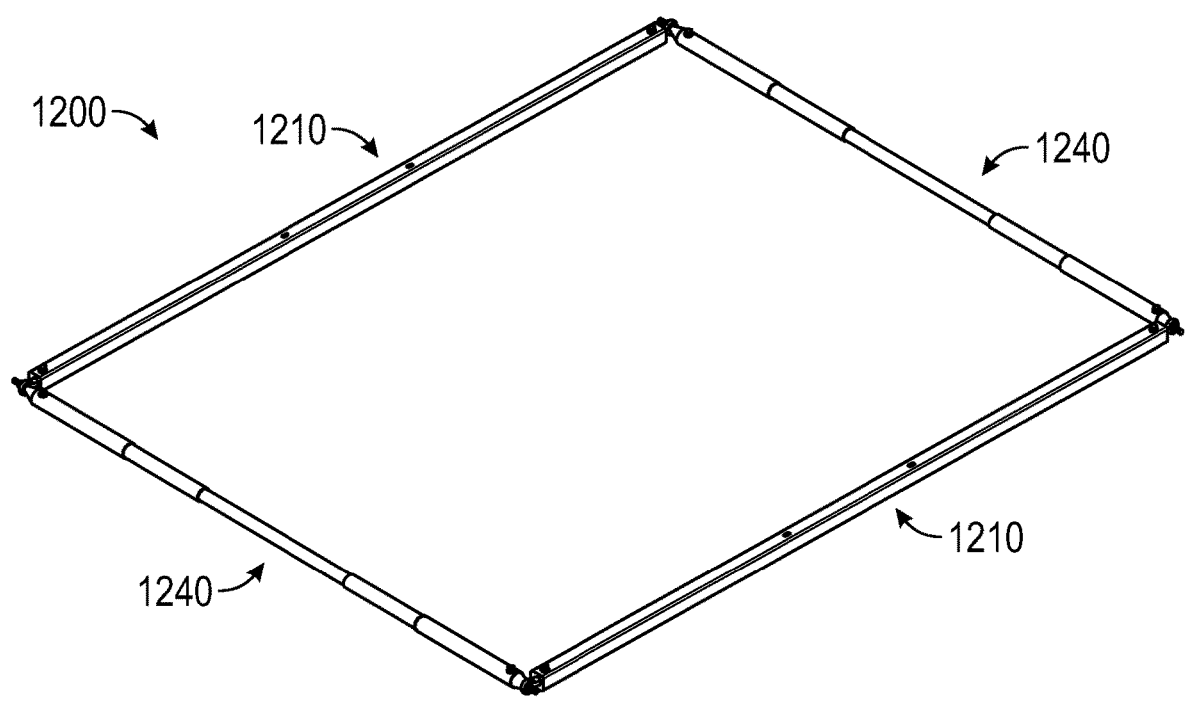
FIG. 27 is a perspective view of the flexible length row-to-row bridge of FIG. 26 shown in an expanded condition.
Figure 28:
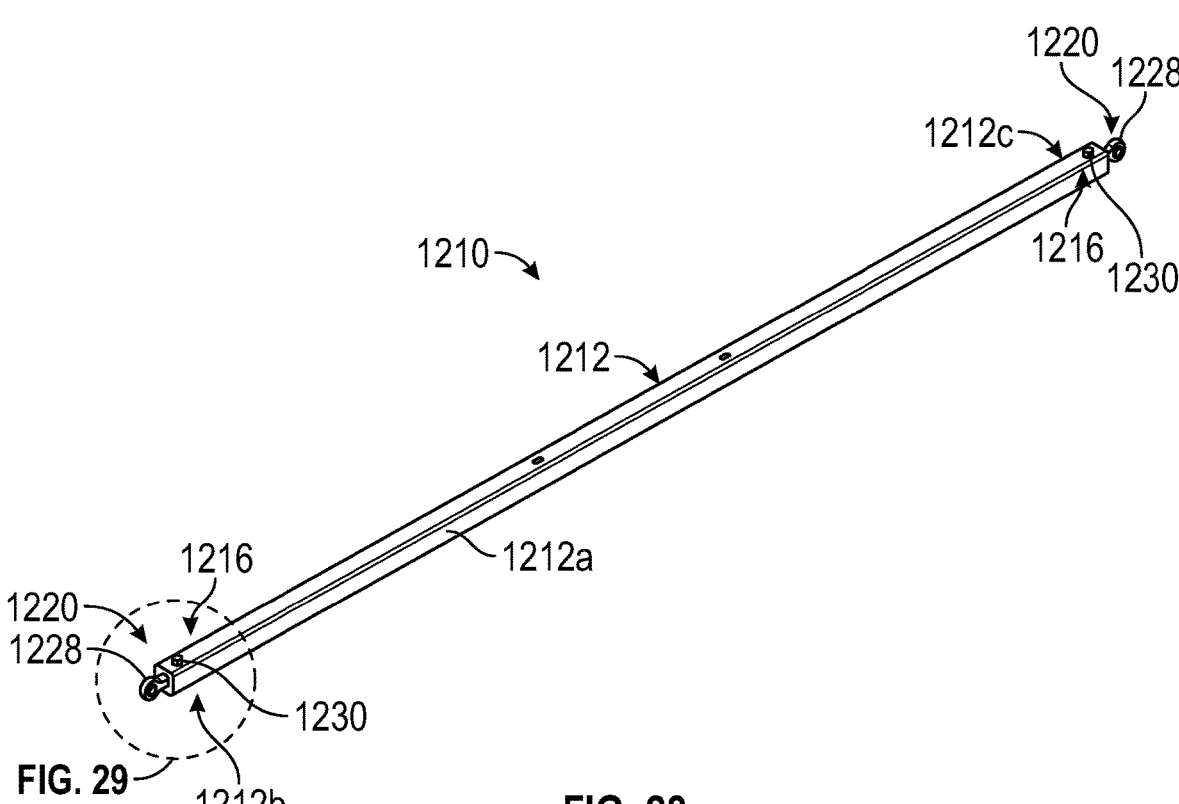
FIG. 28 is a perspective view of a transverse beam of the flexible length row-to-row bridge of FIG. 26.

Turning to FIGS. 24-25, a collapsible bridge is illustrated and generally identified by reference numeral 1100. The collapsible bridge 1100 includes first and second parallel beams 1102 and 1104 disposed in spaced relation to one another and extending between respective first and second end portions 1102*a*, 1102*b* and 1104*a*, 1104*b*, respectively. The collapsible bridge 1100 includes first and second transverse beams 1106 and 1108 extending between respective first and second end portions 1106*a*, 1106*b* and 1108*a*, 1108*b*, respectively. The first transverse beam 1106 is interposed between the first and second parallel beams 1102, 1104 such that the first end portion 1106*a* is disposed adjacent to the first end portion 1102*a* of the first parallel beam and the second end portion 1106*b* is disposed adjacent to the first end portion 1104*a* of the second parallel beam 1104. Similarly, the second transverse beam 1108 is interposed between the first and second parallel beams 1102, 1104 such that the first end portion 1108*a* is disposed adjacent to the second end portion 1102*b* of the first parallel beam 1102 and the second end portion 1108*b* is disposed adjacent to the second end portion 1104*b* of the second parallel beam 1104. Although generally illustrated as defining a square profile, it is contemplated that each of the first and second parallel beams 1102, 1104 and the first and second transverse beams 1106, 1108 may include any suitable length, and may define any suitable profile, such as rectangular, trapezoidal, oval, amongst others.

Each of the first and second transverse beams 1106 and 1108 include a respective mounting bracket 1110 coupled thereto using any suitable means, such as welding, fasteners, adhesives, amongst others. The mounting brackets 1110 are substantially similar to first bracket 250*a* (FIG. 5A), and therefore, the mounting bracket 1110 will not be described in detail herein in the interest of brevity. Although generally described as being coupled to the first and second transverse beams 1106, 1108, it is envisioned that the mounting brackets 1110 may be coupled to each of the first and second parallel beams 1102, 1104. As can be appreciated, the mounting brackets 1110 are configured to selectively couple the collapsible bridge 1100 to a torque tube of a solar modules 1002 or the like.

The collapsible bridge 1100 includes a plurality of hinges 1112 (FIG. 24A) disposed adjacent each of the intersection of the first end portion 1102*a* and first end portion 1106*a*, the second end portion 1102*b* and the first end portion 1108*a*, the second end portion 1106*b* and the first end portion 1104*a*, and the second end portion 1104*b* and the second end portion 1108*b*, respectively. The plurality of hinges 1112 may be coupled to each of the first and second parallel beams 1102, 1104 and the first and second transverse beams 1106, 1108 using any suitable means, such as fasteners, welding, adhesives, amongst others. As can be appreciated, the plurality of hinges 1112 enable each of the first and second parallel beams 1102, 1104 and the first and second transverse beams 1106, 1108 to rotate with respect to one another from a first, expanded position (FIG. 24), to a second, collapsed position, in which each of the first and second parallel beams 1102, 1104 and first and second transverse beams 1106, 1108 are parallel to one another (FIG. 24B). It is envisioned that the plurality of hinges 1112 may be any suitable type of hinge capable of permitting the collapsible bridge to transition from the first, expanded position to the second, collapsed position.

Turning to FIGS. 26-38, another embodiment of a flexible length row-to-row bridge is illustrated and generally identified by reference numeral 1200. The flexible length row-to-row bridge 1200 includes a pair of transverse beam assemblies 1210 and a pair of parallel beam assemblies 1240.

Each of the pair of transverse beam assemblies 1210 is substantially similar to one another and therefore, only one transverse beam assembly of the pair of transverse beam assemblies 1210 will be described herein in the interest of brevity. The transverse beam assembly 1210 includes an elongate body 1212 and a coupling assembly 1220 operably coupled to a portion of the elongate body 1212, as will be described in further detail hereinbelow. The elongate body 1212 includes an outer surface 1212a extending between opposed first and second end portions 1212b and 1212c, respectively. Although generally described has having a rectangular profile, it is envisioned that the elongate body 1212 may include any suitable profile, such as circular, oval, rectangular, hexagonal, amongst others. The elongate body includes an inner surface 1214 defining a throughbore 1214a extending through each of the first and second end portions 1212b, 1212c, respectively, although it is contemplated that the throughbore 1212a may only extend partially within the elongate body 1212 through one or both of the first and second end portions 1212b, 1212c. The elongate body 1212 includes a pair of bores 1216 defined through the outer surface 1212a that is configured to selectively receive a portion of a fastener of the coupling assembly 1220 therethrough. Each of the pair of bores 1216 is disposed adjacent a respective one of the first and second end portions 1212b, 1212c and extending through the entirety of the elongate body 1212, although it is contemplated that one or both of the pair of bores 1216 may extend partially through the elongate body depending upon the design needs of the flexible length row-to-row bridge 1200.

Figure 29:
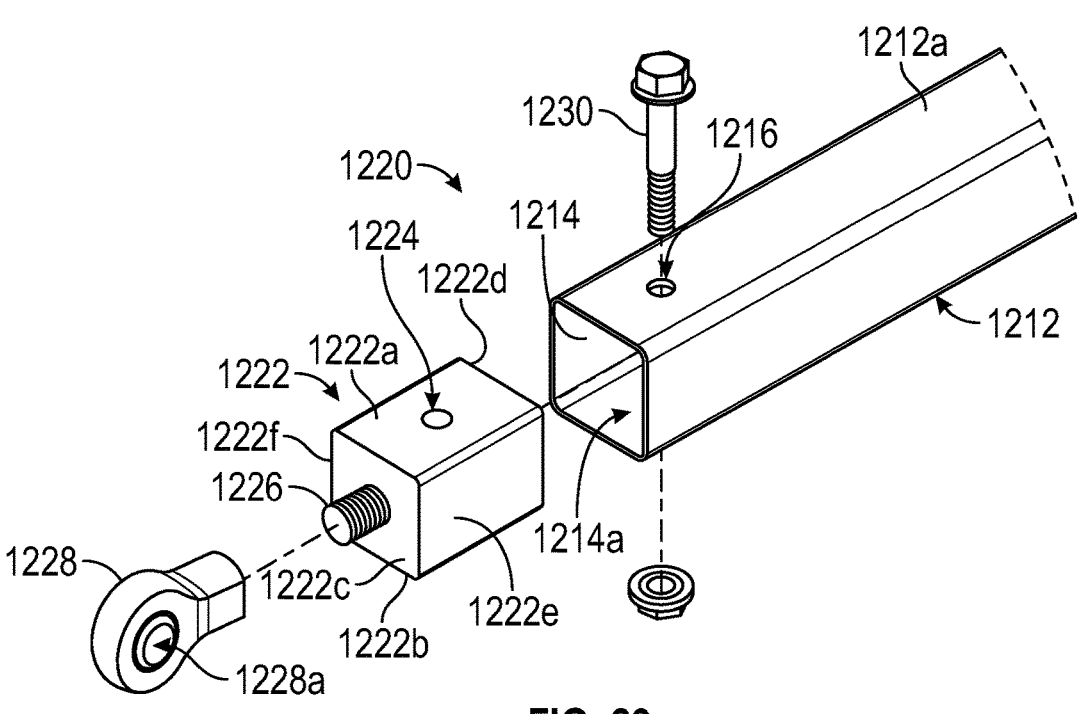
FIG. 29 is an enlarged, exploded view, of the area of detail indicated in FIG. 28.
Figure 30:
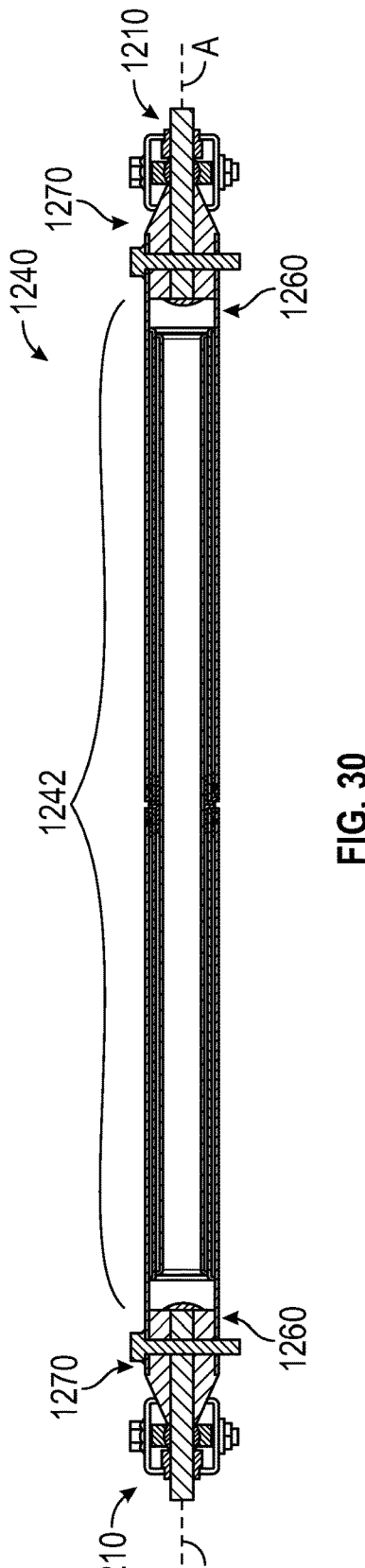
FIG. 30 is a cross-sectional view of a parallel beam of the flexible length row-to-row bridge of FIG. 26, shown in a collapsed condition.

With reference to FIG. 29, the coupling assembly 1220 includes a coupling block 1222, a swivel joint 1228 and a fastener 1230. The coupling block 1222 includes opposed top and bottom surfaces 1222a and 1222b, respectively, each extending between opposed first and second end surfaces 1222c and 1222d, respectively and opposed first and second side surfaces 1222e and 1222f, respectively, each extending between each of the top and bottom surfaces 1222a, 1222b and the first and second end surfaces 1222c, 1222d. The coupling block 1222 includes a profile that generally corresponds to the profile of the throughbore 1214a of the elongate body such that the coupling block 1222 can be slidably received therein, although it is contemplated that the coupling block 1222 may include any suitable profile depending upon the design needs of the flexible length row-to-row bridge 1200. The coupling block 1222 includes an aperture 1224 defined through each of the top and bottom surfaces 1222a, 1222b that is configured to selectively receive a portion of the fastener 1230 to selectively couple the coupling block 1222 to the elongate body 1212. A threaded shaft 1226 is operably coupled to a portion of the first end surface 1222c of the coupling block 1222 at a center portion thereof, although it is contemplated that the threaded shaft 1226 may be disposed at any suitable location on the first end surface 1222c. It is envisioned that the threaded shaft 1226 may be coupled to the first end surface 1222c of the coupling block 1222 using any suitable means, such as being threadably engaged, fasteners, welding, adhesives, formed as a unitary component via machining, additive manufacturing, etc.

The coupling block 1222 is selectively coupled to the elongate body 1212 by the fastener 1230. In this manner, the coupling block 1222 is received within the throughbore 1214a of the elongate body 1212 such that the aperture 1224 is generally aligned with a respective bore of the pair of bores 1216. With the aperture 1224 and the bore 1216 in general alignment, the fastener 1230 is advanced within the throughbore 1214a and the aperture 1224 to selectively retain the coupling block 1222 to the elongate body 1212. It is envisioned that the fastener 1230 may be a bolt and nut assembly, a bolt threadably engaging a portion of the coupling block and/or the elongate body 1212. In embodiments, the coupling block 1222 may be coupled to the elongate body 1212 by rivets, adhesives, welding, amongst others.

The swivel joint 1228 is a female heim joint or spherical rod end that is configured to threadably engage a portion of the threaded shaft 1226 to couple the swivel joint 1228 to the coupling block 1222. The swivel joint 1228 includes a hole 1228a defined through a portion of the bearing portion thereof to selectively retain a portion of parallel beam of the pair of parallel beam assemblies 1240 thereto to permit radial misalignment of the parallel beam assembly 1240 relative to the transverse beam assembly 1210, as will be described in further detail hereinbelow. Although generally described as being a female heim joint, it is envisioned that the swivel joint 1228 may be a male heim joint that is configured to threadably engage a portion of the coupling block 1222 in lieu of the threaded shaft 1226. In embodiments, the swivel joint 1228 may be coupled to the coupling block 1222 by welding, adhesives, fasteners, amongst others. As can be appreciated, a coupling assembly 1220 is coupled to each respective first and second end portion 1212b and 1212c of the elongate body 1212.

With reference to FIGS. 30-35, each of the pair of parallel beam assemblies 1240 is substantially similar to one another and therefore, only one parallel beam assembly of the pair of parallel beam assemblies 1240 will be described herein in the interest of brevity. The parallel beam assembly 1240 includes an extension assembly 1242 and an end-cap assembly 1270 coupled to respective portions of the extension assembly 1242, as will be described in further detail hereinbelow.

The extension assembly 1242 includes a plurality of nested beams configured to be nested within one another in a first, collapsed condition, and extend from one another in a second, expanded condition, along a longitudinal axis A-A to accommodate adjacent solar modules 1002 that are placed at angles that are different from one another (e.g., a first solar module 1002 is caused to be placed in a first angle and a second, adjacent solar module 1002 is caused to be placed in a second angle that is different than the first angle due to a location of the sun relative to the first and second solar modules). In this manner, the extension assembly 1242 includes a center beam 1244, a pair of intermediate beams 1246, and a pair of outer beams 1260. The center beam 1244 includes an outer surface 1244a extending between opposed first and second end portions 1244b and 1244c, respectively. Although generally illustrated as having a circular cross-sectional profile, it is envisioned that the center beam 1244 may include any suitable cross-sectional profile, such as square, oval, rectangular, hexagonal, amongst others. Each of the first and second end portions 1244*b*, 1244*c* of the center beam 1244 is swaged or otherwise includes an upturned flange 1244*d* (FIG. 32) extending radially outward from the outer surface 1244*a* that is configured to operably engage a corresponding feature formed in each of the pair of intermediate beams 1246 to limit or otherwise control a distance the intermediate beams 1246 may be extended from the center beam 1244, as will be described in further detail herein below.

Each of the pair of intermediate beams 1246 is substantially similar to each other and therefore, only one intermediate beam of the pair of intermediate beams 1246 will be described in detail herein in the interest of brevity. The intermediate beam 1246 includes generally circular cross-sectional profile having an outer surface 1246*a* extending between opposed first and second end portions 1246*b* and 1246*c*, respectively. Although generally described as having a circular cross-sectional profile, it is envisioned that the intermediate beam 1246 may include a cross-sectional profile that is generally the same or different than the cross-sectional profile of the center beam 1244.

The intermediate beam 1246 includes an inner surface 1248 defining a throughbore 1248*a* extending through each of the first and second end portions 1246*b*, 1246*c*, respectively. The throughbore 1248*a* includes an inner dimension that is substantially equal to or greater than an outer dimension of the upturned flange 1244*d* of the center beam 1244 such that the intermediate beam 1246 is permitted to slidably receive the center beam 1244 within the throughbore 1248*a*. The first end portion 1246*b* of the intermediate beam 1246 includes an upturned flange 1246*d* disposed on the outer surface 1246*a* that is substantially similar to the upturned flange 1244*d* of the center beam 1244 described hereinabove. The upturned flange 1246*d* is configured to engage or otherwise abut a corresponding feature formed in the outer beam 1260 to limit or otherwise control a distance the outer beam 1260 may be extended from the intermediate beam 1246, as will be described in further detail hereinbelow.

The intermediate beam 1246 includes a bushing or bearing 1250 (FIGS. 32 and 33) operably coupled to the second end portion 1246*c* thereof. The bushing 1250 includes a generally top-hat configuration having a tubular portion 1252 including an outer surface 1252*a* extending between opposed first and second end portions 1252*b* and 1252*c*, respectively. The outer surface 1252*a* includes a flange 1254 disposed therein and extending radially therefrom and is disposed adjacent the second end portion 1252*c*. The bushing 1250 includes an inner surface 1256 defining a bore 1256*a* extending through each of the first and second end portions 1252*b*, 1252*c*, respectively. The outer surface 1252*a* of the tubular portion 1252 of the bushing 1250 is approximately the same or less than the inner dimension of the throughbore 1248*a* of the intermediate beam 1246 such that the tubular portion 1252 of the bushing 1250 is permitted to be slidably received within the throughbore 1248*a* until a portion of the flange 1254 abuts the second end portion 1246*c* of the intermediate beam 1246 an inhibits further advancement of the bushing within the throughbore 1248*a*.

An outer dimension of the flange 1254 is substantially the same or less than an outer dimension of the intermediate beam 1246. An inner dimension of the bore 1256*a* of the bushing 1250 is substantially similar to or greater than the outer dimension of the center beam 1244 such that a portion of the center beam 1244 is permitted to be slidably received therein. It is envisioned that the bushing 1250 may be selectively or permanently coupled to the intermediate beam

1246 using any suitable means, and in one non-limiting embodiment, is selectively coupled to the intermediate beam 1246 via one or more fasteners, such as a screw, amongst others. The bushing may be formed from any suitable material, such as a polymer, a ceramic, a metallic material, amongst others. As can be appreciated, the bushing 1250 minimized friction caused be the center beam 1244 sliding relative to the intermediate beam 1246, and vice versa, and minimizes radial misalignment of the center beam 1244 relative to the intermediate beam 1246. In operation, the first end portion 1252*b* is configured to abut or otherwise engage a portion of the upturned flange 1244*d* of the center beam to inhibit further movement of the inner beam 1244 relative to the outer beam 1246, and vice versa.

Figure 36:
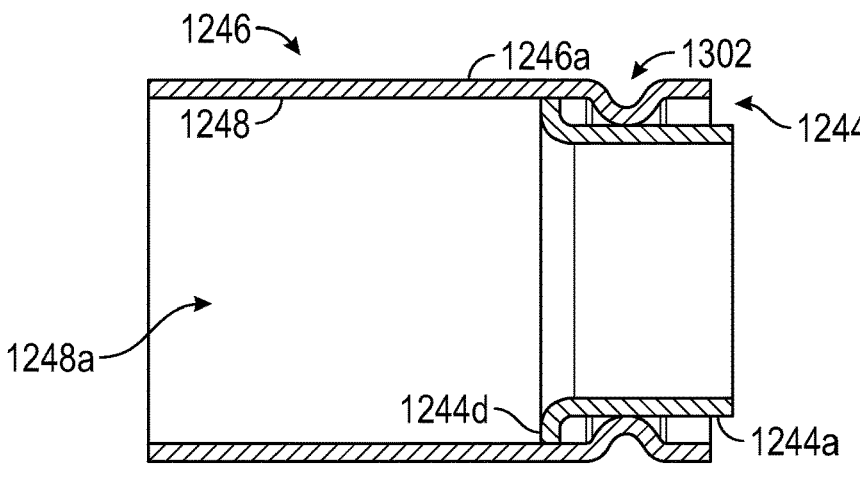
FIG. 36 is a cross-sectional view of another embodiment of an outer tube of a parallel beam of the flexible length row-to-row bridge of FIG. 26.
Figure 37:
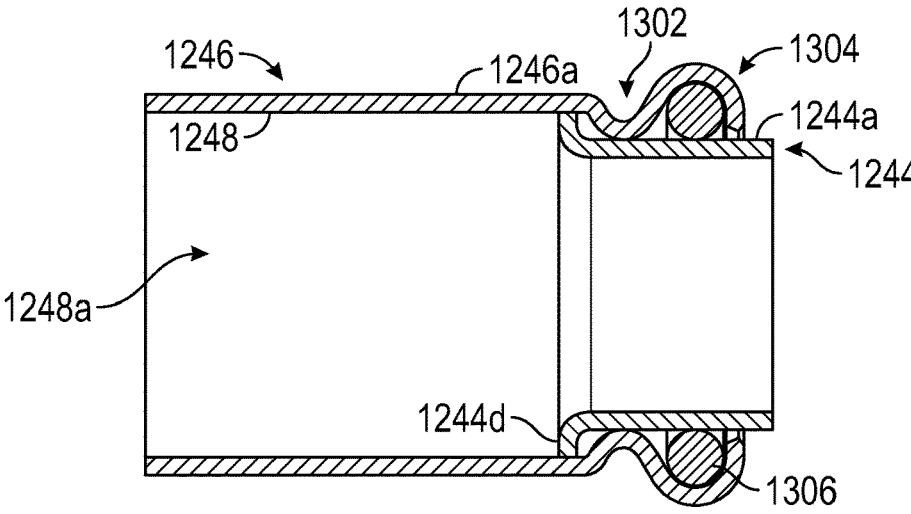
FIG. 37 is a cross-sectional view of another embodiment of an outer tube of a parallel beam of the flexible length row-to-row bridge of FIG. 26.
Figure 38:
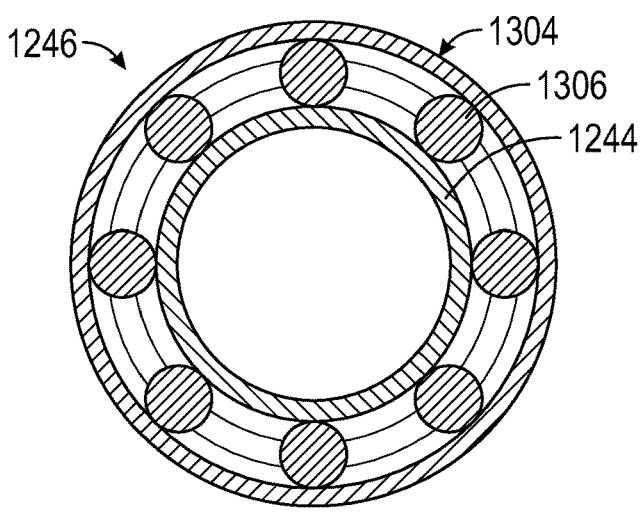
FIG. 38 is a front, cross-sectional view of the outer tube of the FIG. 37.

With reference to FIGS. 36-38, it is envisioned that the parallel beam assembly 1240 may not include a bushing 1250, and rather, the outer surface 1246*a* of the intermediate beam 1246 may be crimped or otherwise deformed to create one or more protuberances 1302 extending into the throughbore 1248*a* of the intermediate beam to engage or otherwise abut a portion of the upturned flange 1244*d* of the center beam 1244. Although generally described as being one or more protuberances, it is envisioned that the one or more protuberances 1302 may be a continuous annular boss, amongst others. In embodiments, in addition to the one or more protuberances 1302, the intermediate beam may include a downturned U-shaped profile 1304 (FIG. 37) adjacent the second end portion 1246*c* that is configured to capture a plurality of balls or spherical rollers 1306 therein (FIG. 38). In this manner, with the center beam 1244 received within the throughbore 1248*a* of the intermediate beam 1246, the plurality of spherical rollers 1306 abut or otherwise contact a portion of the outer surface 1244*a* of the center beam 1244 to reduce or otherwise minimize friction between the center beam 1244 and the intermediate beam 1246.

Returning to FIGS. 30-33 and with additional reference to FIGS. 34 and 35, each of the pair of outer beams 1260 is substantially similar to one another and therefore only one outer beam of the pair of outer beams 1260 will be described herein in the interest of brevity. The outer beam 1260 includes a generally circular cross-sectional profile having an outer surface 1260*a* extending between opposed first and second end portions 1260*b* and 1260*c*, respectively. Although generally described as having a circular cross-sectional profile, it is envisioned that the outer beam 1260 may include a cross-sectional profile that is generally the same or different than the cross-sectional profile of the center beam 1244 and/or the intermediate beam 1246. The outer beam 1260 includes an inner surface 1262 defining an aperture 1262*a* extending through each of the first and second end portions 1260*b*, 1260*c*, respectively. The aperture 1262*a* includes an inner dimension that is substantially equal to or greater than the outer dimension of the upturned flange 1246*d* of the intermediate beam 1246 such that the outer beam 1260 is permitted to slidably receive a portion of the intermediate beam 1246 within the aperture 1262*a*.

The outer beam 1260 includes a bushing 1250 disposed within the aperture 1262*a* adjacent the second end portion 1260*c* that serves substantially the same purpose of the bushing 1250 disposed within the intermediate beam 1246. The outer beam 1260 includes a hole 1264 defined through the outer surface 1260*a* adjacent the first end portion 1260*b* that is configured to receive a portion of the second fastener 1300 of the end-cap assembly 1270, as will be described in further detail hereinbelow.

Figure 34:
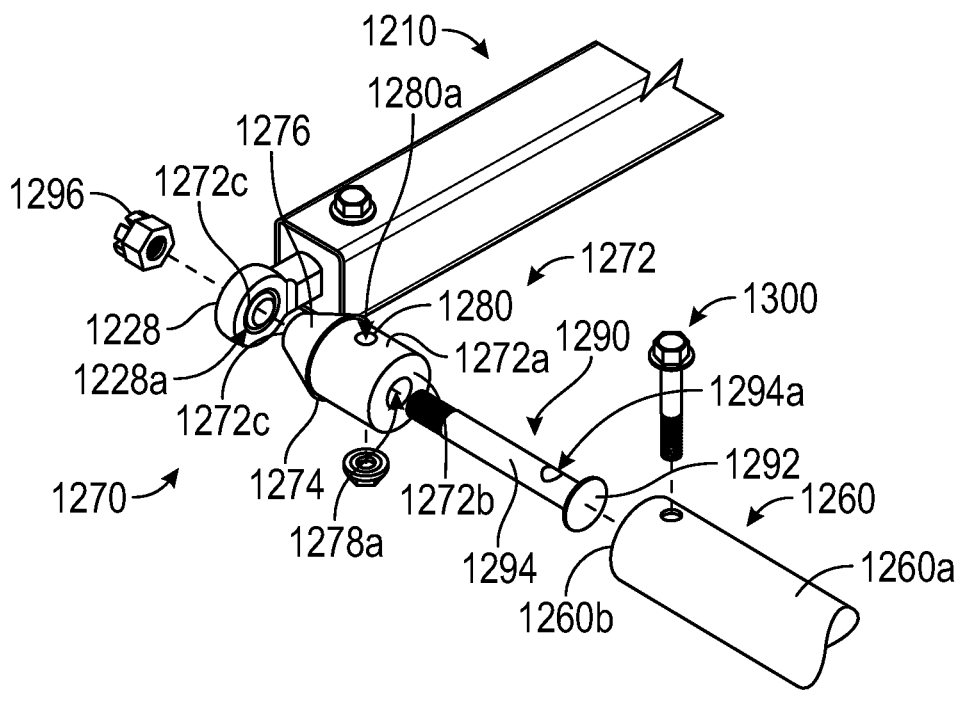
FIG. 34 is an exploded, perspective view of a connection of the parallel beam to a transverse beam of the flexible length row-to-row bridge of FIG. 26.
Figure 35:
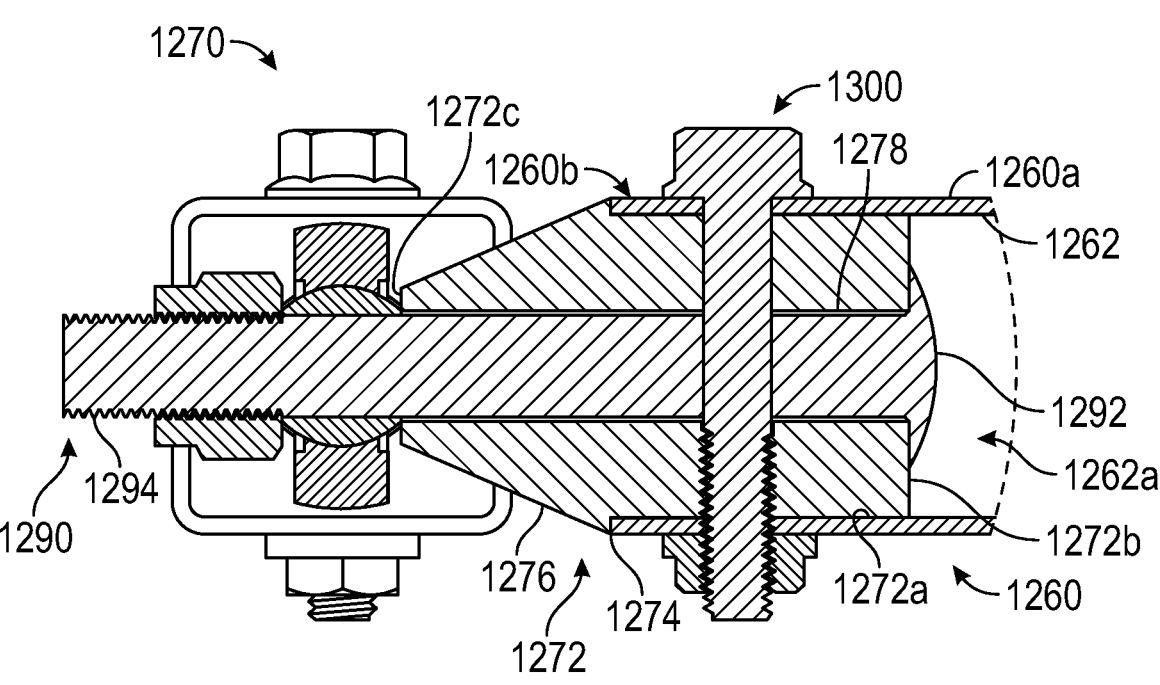
FIG. 35 is a cross-sectional view of the connection of a parallel beam to a transverse beam of the flexible length row-to-row bridge of FIG. 26.

With reference to FIGS. 34 and 35, the end-cap assembly 1270 includes a coupling block 1272, a first fastener 1290, and a second fastener 1300. The coupling block 1272 defines a generally circular cross-sectional profile having an outer surface 1272a extending between opposed first and second end portions 1272b and 1272c, respectively. The outer surface 1272a of the coupling block 1272 includes an outer dimension that is substantially equal to or less than the inner dimension of the aperture 1262a such that the first end portion 1272b of the coupling block 1272 is permitted to be slidably received within the aperture 1262a adjacent the first end portion 1260b of the outer beam 1260. The outer surface 1272a of the coupling block 1272 includes an annular flange 1274 disposed thereon and extending radially therefrom. Although generally illustrated as having an outer dimension that is substantially equal to the outer dimension of the outer beam 1260, it is envisioned that the annular flange 1274 may include any suitable outer dimension that inhibits further advancement of the coupling block 1272 within the aperture 1262a of the outer beam 1260. The coupling block 1272 includes a generally frusto-conical profile 1276 extending from the annular flange 1274 towards the second end portion 1272c. In this manner, the outer dimension of the coupling block 1272 decreases from the outer dimension of the annular flange 1274 towards the second end portion 1272c, although it is contemplated that coupling block 1272 may include any suitable profile between the annular flange 1274 and the second end portion 1272c.

The coupling block 1272 includes a first inner surface 1278 defining a bore 1278a extending through each of the first and second end portions 1272b, 1272c, respectively, that is configured to receive a portion of the first fastener 1290 therethrough, as will be described in further detail hereinbelow. The coupling block 1272 includes a second inner surface 1280 defining a transverse bore 1280a that extends through the outer surface 1272a such that a portion of the second fastener 1300 is permitted to be received therein, as will be described in further detail hereinbelow.

It is envisioned that the first fastener 1290 may be any suitable fastener, such as a carriage bolt, a hex bolt, a button head, a cap screw, amongst others. The first fastener 1290 includes a head 1292 and a shank 1294 disposed thereon and extending longitudinally therefrom. The shank 1294 includes an outer dimension that is configured to be slidably received within the bore 1278a of the coupling block 1272 such that a portion of the head 1292 abuts or otherwise contacts a portion of the first end portion 1272b of the coupling block to inhibit further advancement of the first fastener 1290 therethrough. The shank 1294 includes a transverse hole 1294a defined therethrough that is configured to receive a portion of the second fastener 1300 therethrough.

In this manner, with the first fastener 1290 received within the bore 1278 of the coupling block 1272 and the head 1292 abutting the first end portion 1272b, the transverse bore 1280a of the coupling block 1272 and the transverse hole 1294a of the first fastener 1290 are substantially aligned with one another. At this point, the coupling block 1272 is advanced within the aperture 1262a adjacent the first end portion 1260b of the outer beam 1260 until the annular flange 1274 abuts or otherwise contacts the first end portion 1260b of the outer beam 1260 to inhibit further advancement of the coupling block 1272 within the aperture 1262a. In this position, the hole 1264 of the outer beam 1260, the transverse bore 1280a of the coupling block 1272, and the transverse hole 1294a of the first fastener 1290 are substantially aligned with one another such that second fastener

1300 may be advanced within each of the hole 1264, the transverse bore 1280a, and the transverse hole 1294a to secure or otherwise couple the coupling block 1272 and the first fastener 1290 to the outer beam 1260 and inhibit rotation and translation of the coupling block 1272 and the first fastener 1290 relative to the outer beam 1260. The shank 1294 of the first fastener 1290 is configured to be received within the bore 1228a of the swivel joint 1228 and coupled thereto using a nut 1296 or other suitable fastening device (FIG. 35).

Figure 31:
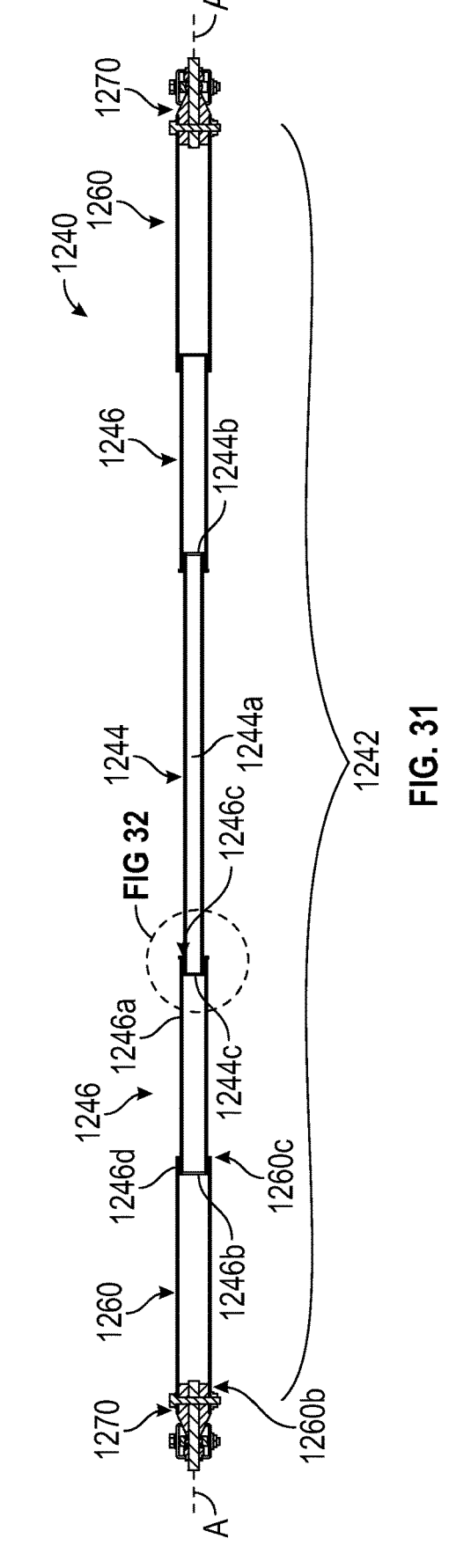
FIG. 31 is a cross-sectional view of the parallel beam of FIG. 30, shown in an expanded condition.
Figure 32:
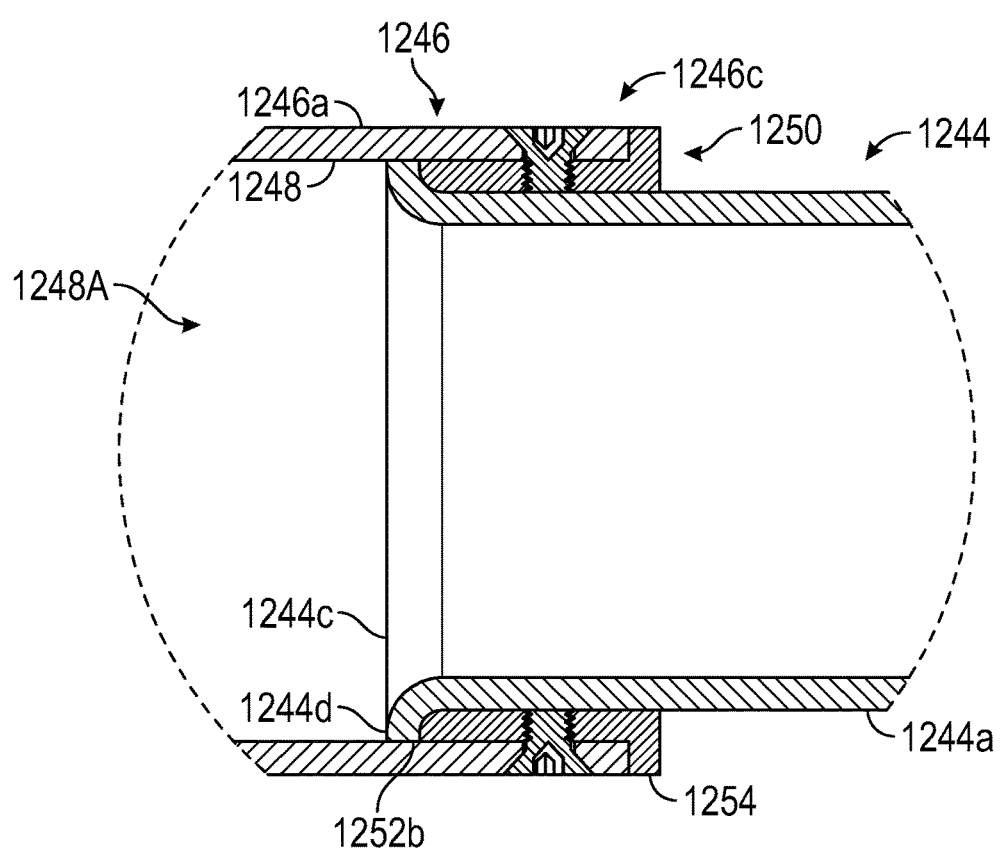
FIG. 32 is an enlarged view of the area of detail indicated in FIG. 31.
Figure 33:
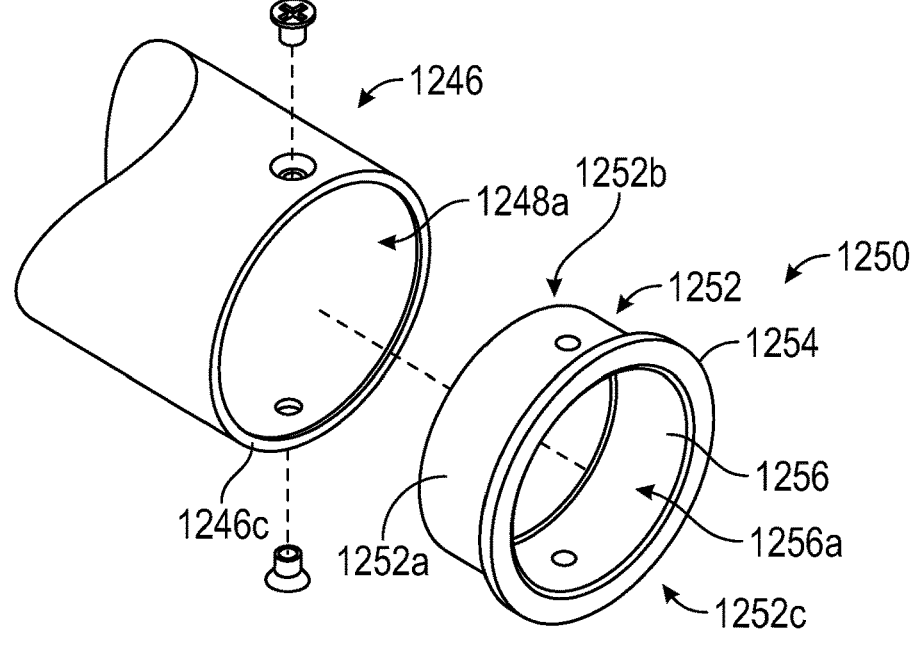
FIG. 33 is enlarged, exploded view of the area of detail indicated in FIG. 31.

Returning to FIGS. 26 and 27, in operation, each respective transverse beam assembly 1210 is coupled to a respective solar module 1002. When the adjacent solar modules 1002 are oriented at the same or substantially the same angle relative to one another, the flexible length row-to-row bridge 1200 is placed in the first collapsed condition (FIG. 30) such that each of the center beam 1244, the pair of intermediate beams 1246, and the pair of outer beams 1260 are in a nested configuration. In the collapsed condition, the length of the pair of parallel beams 1240 (e.g., extending in a longitudinal direction across the solar modules 1002), can be approximately 700 mm. As one solar module 1002 is caused to be rotated relative to an adjacent solar module 1002, the pair of outer beams 1260 is caused to be drawn away from one another causing one or both of the outer beams 1260 to translate relative to one or both of the intermediate beams 1246 and the center beam 1244 to expand one or both of the pair of parallel beam assemblies 1240 (FIG. 31). As can be appreciated, one parallel beam assembly of the pair of parallel beam assemblies 1240 may expand at a faster rate than the other. In this manner, the swivel bearing 1228 accommodates an angular misalignment of the adjacent solar modules 1002 of up to approximately +/−60 degrees. Continued misalignment of the adjacent solar modules 1002 causes one or both of the pair of parallel beam assemblies 1240 to continue to expand. It is envisioned that the pair of parallel beam assemblies 1240 can accommodate extension up to approximately 1625 mm.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A row-to-row bridge for use with a solar tracking system, comprising:
  a frame comprising a plurality of beams to enable cleaning equipment to move from a first solar module at an end of a first row of solar modules to a second solar module at an end of a second row of solar modules, the second row of solar modules being adjacent to the first row of solar modules, the first and second rows of solar modules capable of rotating about an axis to track movement of a sun, the frame configured to selectively support the cleaning equipment while moving from the first solar module to the second solar module, wherein the plurality of beams of the frame includes rotatable couplings configured to accommodate twisting of a first end portion of the frame relative to a second end portion of the frame when the first and second rows of solar modules rotate about the axis;
  a first mounting bracket interconnecting the first end portion of the frame and a portion of the first solar module at the end of the first row of solar modules; and a second mounting bracket interconnecting the second end portion of the frame and a portion of the second solar module at the end of the second row of solar modules.

2. The row-to-row bridge according to claim 1, wherein the frame includes a pair of transverse beams disposed in spaced relation to one another and each extending between opposed first and second end portions, each of the pair of transverse beams coupled to a respective one of the first and second adjacent solar modules such that rotation of the adjacent first and second solar modules effectuates a corresponding rotation of the frame.

3. The row-to-row bridge according to claim 2, wherein the frame includes a pair of parallel beams interposed between the pair of transverse beams and rotatably coupled thereto, wherein the pair of parallel beams are configured to rotate relative to the pair of transverse beams to permit differing degrees of rotation of a first transverse beam relative to a second transverse beam about an axis defined perpendicular to the pair of transverse beams.

4. The row-to-row bridge according to claim 3, wherein each of the parallel beams includes an inner tube and an outer tube configured to rotatably and translatably receive a portion of the inner tube therein.

5. The row-to-row bridge according to claim 4, wherein each of the parallel beams includes an insert disposed within a portion of the outer tube, the insert defining a bore therethrough configured to rotatably and translatably support a portion of the inner tube therein.

6. The row-to-row bridge according to claim 5, wherein each of the parallel beams includes a corresponding pair of couplings operably coupled to respective first and second end portions thereof, each of the pair of couplings configured to rotatably couple the pair of parallel beams to each respective transverse beam of the pair of transverse beams.

7. A bridge for use with a solar tracking system, comprising:

a frame comprising a plurality of beams to enable cleaning equipment to move from a first solar module to an adjacent second solar module across a gap, a slew drive being interposed between the first solar module and the second solar module to form the gap therebetween, the slew drive configured to effectuate rotation of the first solar module and the second solar module about an axis, the frame configured to selectively support the cleaning equipment while moving from the first solar module to the second solar module; and a pair of mounting brackets configured to couple the frame to a pair of adjacent torque tubes, each torque tube coupled to a respective output of the slew drive, wherein the frame is configured to selectively permit adjustment of a width of the frame.

8. The bridge according to claim 7, wherein the frame is collapsible from an open, expanded position to a closed, folded position.

9. The bridge according to claim 8, wherein the frame includes hinges operably coupled thereto to permit the transition from the open, expanded position, to the closed, folded position.

10. The bridge according to claim 9, wherein the hinges are disposed adjacent one or more end portions of the plurality of beams forming the frame.

11. The bridge according to claim 7, wherein the frame includes a pair of parallel beams, at least one of the parallel beams defining an arcuate profile.

12. The bridge according to claim 11, wherein the frame includes a pair of transverse beams, at least one of the pair of transverse beams defining a flange, the flange couplable to a portion of an adjacent solar module.

* * * * *